(12) United States Patent
Seleznev et al.

(10) Patent No.: US 12,179,265 B2
(45) Date of Patent: Dec. 31, 2024

(54) COMPOSITES, TOOLING, DIES AND METHODS OF MANUFACTURING THEREOF

(71) Applicant: MARKFORGED, INC., Watertown, MA (US)

(72) Inventors: Maxim Seleznev, Belmont, MA (US); Joseph Roy-Mayhew, Watertown, MA (US)

(73) Assignee: MARKFORGED, INC., Waltham, MA (US)

( * ) Notice: Subject to any disclaimer, the term of this patent is extended or adjusted under 35 U.S.C. 154(b) by 0 days.

(21) Appl. No.: 17/496,310

(22) Filed: Oct. 7, 2021

(65) Prior Publication Data
US 2022/0168809 A1 Jun. 2, 2022

Related U.S. Application Data

(60) Provisional application No. 63/089,181, filed on Oct. 8, 2020.

(51) Int. Cl.
| | |
|---|---|
| *B22F 10/18* | (2021.01) |
| *B22F 5/10* | (2006.01) |
| *B22F 10/66* | (2021.01) |
| *B33Y 10/00* | (2015.01) |
| *B33Y 80/00* | (2015.01) |

(52) U.S. Cl.
CPC ............. *B22F 10/18* (2021.01); *B22F 5/10* (2013.01); *B22F 10/66* (2021.01); *B33Y 10/00* (2014.12); *B33Y 80/00* (2014.12); *B22F 2201/01* (2013.01); *B22F 2301/35* (2013.01); *B22F 2998/10* (2013.01)

(58) Field of Classification Search
CPC .. B22F 5/10; B22F 10/18; B22F 10/66; B22F 2201/01; B22F 2301/35; B22F 2998/10; B22F 5/007; B22F 2005/002; B22F 2999/00; B22F 7/00; B22F 10/64; B22F 3/004; B22F 2202/01; B22F 3/10; B22F 3/1025; B33Y 10/00; B33Y 80/00; B21D 37/20
See application file for complete search history.

(56) References Cited

U.S. PATENT DOCUMENTS

| | | | |
|---|---|---|---|
| 2007/0060463 A1* | 3/2007 | Gaumann | B22F 5/10 264/632 |
| 2016/0258298 A1* | 9/2016 | Channel | B22F 5/10 |
| 2016/0279708 A1* | 9/2016 | Hann | B23K 26/342 |

(Continued)

FOREIGN PATENT DOCUMENTS

| | | | | |
|---|---|---|---|---|
| WO | WO-2018209029 A1 * | 11/2018 | | B22F 10/10 |
| WO | WO-2021096517 A1 * | 5/2021 | | B22F 10/22 |

*Primary Examiner* — Adil A. Siddiqui
(74) *Attorney, Agent, or Firm* — Lando & Anastasi, LLP

(57) ABSTRACT

Metal composites, tooling and methods of additively manufacturing these are disclosed. Metal objects and structures as provided herein are additively manufactured from metal having an infill pattern infiltrated with a metal powder. Also provided herein are methods of forming such objects and structures. Methods include additively manufacturing a metal structure having an interior printed using an infill. Steps can further include infiltrating the printed infill of the structure with a powder metal thereby forming a composite.

13 Claims, 35 Drawing Sheets
(1 of 35 Drawing Sheet(s) Filed in Color)

(56) References Cited

U.S. PATENT DOCUMENTS

| | | | | |
|---|---|---|---|---|
| 2017/0184108 A1* | 6/2017 | Scancarello | ............ | B33Y 70/00 |
| 2018/0221950 A1* | 8/2018 | Mark | ..................... | B33Y 10/00 |
| 2018/0305266 A1* | 10/2018 | Gibson | ................. | B33Y 40/20 |
| 2019/0240734 A1* | 8/2019 | Tobia | ...................... | B22F 10/10 |
| 2020/0307018 A1* | 10/2020 | Prichard | ................ | B22F 10/28 |
| 2022/0016711 A1* | 1/2022 | Seleznev | ................ | B22F 5/007 |
| 2022/0297183 A1* | 9/2022 | Panda | ..................... | B22F 7/02 |

* cited by examiner

| Specimen ID | Furnace Run # | Modulus (GPa) | Max. Load (N) | Tensile Strength At Max Load (MPa) | Tensile Strain at Break (Std.) (%) | Tensile Strength At Yield (Offset 0.2%) (MPa) | Comment |
|---|---|---|---|---|---|---|---|
| 1 | 52 raptor | ---- | 11279 | 301 | 0.18 | ---- | not at gauge |
| 2 | 52 raptor | ---- | 14168 | 390 | 0.28 | ---- | not gauge |
| 3 | 52 raptor | ---- | 14631 | 382 | 0.27 | ---- | at head, not gauge |
| 4 | 52 raptor | ---- | 10277 | 278 | 0.12 | ---- | head transition |
| 5 | 52 raptor | ---- | 10279 | 277 | 0.08 | ---- | head transition |

COMPOSITES, TOOLING, DIES AND METHODS OF MANUFACTURING THEREOF

CROSS-REFERENCE TO RELATED APPLICATIONS

This application claims priority under 35 U.S.C. § 119(e) to U.S. Provisional Application Ser. No. 63/089,181, titled "Composites, Tooling, Dies and Methods of Manufacturing Thereof" filed Oct. 8, 2020, which is incorporated herein by reference in its entirety for all purposes.

BACKGROUND

Additive manufacturing refers to any one of various manufacturing technologies to three-dimensionally build objects in an additive fashion, for example, in a layer-by-layer manner.

SUMMARY

The present disclosure generally relates to additive manufacturing, including 3D printing of composites, structural tools, dies, dies for injection molds, and methods for manufacturing such composites, tooling & dies. More particularly, and without limitation, the disclosed embodiments relate to, among other things, systems and methods for performing additive manufacturing and forming metallic objects having a composite structure. Metallic composites, structural parts or objects, tooling and dies as provided herein may be formed from two or more metals.

In some aspects, methods of manufacturing an object includes 3D printing the object comprising a metal, wherein the metal forms an outer shell substantially enclosing an interior volume and an infill portion within the interior volume of the object, the infill having a pattern defining structures and space within the interior volume. The methods further include infiltrating the object with a metal powder, e.g., a dry metal powder, such that the metal powder substantially surrounds the infill patterned structures and fills the space within the interior volume of the object.

In some aspects, methods of manufacturing dies include two or more metals where one or both of the metals is composed of powder, such as the dry metal powder. In some aspects, one or more of the dry metal powders is made, manufactured, or processed into a filament prior to printing or being used to manufacture the object. In some aspects, a filament includes one or more binders, such as a polymer or wax. In some aspects, as provided herein a metal filament is fed to a 3D printer for additively manufacturing or 3D printing an object, for example the outer shell and the infill of the object.

In some aspects, a die is 3D printed. The die may be manufactured to have at least one dimension greater than about 1.5 inches. In some aspects, the die may have or may be manufactured to have at least one dimension greater than about 2 inches.

In some aspects, methods of manufacturing dies having 3D printed metal include, for example, metals such as aluminum, copper, stainless steel, titanium, tool steel, or Inconel.

In some aspects, methods of manufacturing dies include forming an infill pattern from the metal, for example, a diamond, gyroid, hexagonal, honeycomb, rectangle, square, or triangle pattern. In some aspects, the infill pattern has a percent fill of between about 30% and about 90%. In some aspects, the infill pattern has a percent fill of between about 40% and about 85%.

In some aspects, methods of manufacturing dies include forming a surface for the outer shell of the object. In some aspects, a surface of the object is unprinted or remains unprinted to expose the infill, that is the gaps or spaces within the infill. In some aspects, the space within the infill is therefore exposed as an opened cell or silo.

In some aspects, methods of manufacturing dies further includes a step of debinding the object, e.g., a green part, to form a brown part. In some aspects, debinding includes submerging the green part in a solvent bath to dissolve, solubilize, and remove the binder, e.g., a wax binder.

In some aspects, methods of manufacturing dies include filling the silos or opened cells with the dry metal powder. In some aspects, filling the silos includes adding, infiltrating, pouring, etc. In some aspects, the infiltrating step includes substantially filling an empty space within the internal volume of the silos. In some aspects, methods of manufacturing dies further includes vibrating the dry metal powder within the open cell cavity or silos.

In some aspects, the dry metal powder includes aluminum, copper, stainless steel, titanium, tool steel, or Inconel.

In some aspects, methods of manufacturing dies further includes a step of additively depositing a separate roof. In some aspects, methods of manufacturing dies further includes providing a separate roof. In some aspects, methods of manufacturing dies further includes working the separate roof on the surface of the outer shell of the object having the exposed and filled silos. In some aspects, working the separate roof compresses, doctors, packs, redistributes, removes, scrapes, etc., powder and/or excess powder. In some aspects, working a separate roof on the surface of the outer shell of the object includes placement of the roof on the object.

In some aspects, methods of manufacturing dies further includes a step of sintering the composite object. In some aspects, the sintering step includes heating in a reducing argon atmosphere. In some aspects, methods further include sintering at a temperature between about 700° C. and 1600° C. In some aspects, methods further include sintering at a temperature between about 1100° C. and 1300° C. In some aspects, sintering includes heating for a time, at a pressure, and in a specified environment. In some aspects, the environment is a high purity environment, such as a reducing environment.

In some aspects, composite structures are formed from methods such as those above described. In some aspects, composite structures include dies as disclosed herein.

In some aspects, composite metal objects include an outer metal shell having a first metal defining a volume. In some aspects, the volume includes a patterned infill of the first metal. In some aspects, a dry metal powder substantially surrounds the infill pattern.

In some aspects, dies as provided herein are substantially free of any cracks, defects, or deformations. In some aspects, a die may have one or more dimensions of at least 3 inches and the object may be substantially free of any cracks, defects, or deformations. In some aspects, composite structures as provided herein include forming strong, stiff dies that may have any of the above dimensions with high density, such that the relative density is at least about 90% to about 99% of a theoretical wrought density for such an object.

These and other capabilities of the disclosure, along with the disclosure itself, will be more fully understood after a review of the following figures, detailed description, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of one or more embodiments are discussed below with reference to the accompanying figures, which are not intended to be drawn to scale. The figures are included to provide an illustration and a further understanding of the various aspects and embodiments. The figures are incorporated in and constitute a part of this specification. But the figures are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 5A shows an image of a sheet metalworking die. FIG. 5B shows an image of a bulk deformation die.

FIG. 6A shows representative mechanical stress. FIG. 6B shows representative thermal stress.

FIG. 9A is an image of the top-side (open-cell infill) of the final sintered object. FIG. 9B is an image of the bottom-side of the final sintered object.

FIG. 10A is an image of the lengthwise side of the final sintered block. FIG. 10B is an image of the widthwise side of the final sintered block.

FIG. 14A is an image of the lengthwise side of the PF13-FF final sintered object.

FIG. 14B is an image of the lengthwise side of the PF20-FF final sintered object.

FIG. 15A shows PF5-FF filled at 500× magnification. FIG. 15B shows PF5-FF filled at 1000× magnification. FIG. 15C shows PF5-FF filled at 2000× magnification. FIG. 15D shows PF13-FF filled at 500× magnification. FIG. 15E shows PF13-FF filled at 1000× magnification. FIG. 15F shows PF13-FF filled at 2000× magnification. FIG. 15G shows PF20-FF filled at 500× magnification. FIG. 15H shows PF20-FF filled at 1000× magnification. FIG. 15I shows PF20-FF filled 2000× magnification.

FIG. 19A and FIG. 19B highlight the porosity at an interface of the printed and powder-filled areas.

FIG. 20A shows mechanical break data for PF5-FF filled material. FIG. 20B shows images of mechanical break of samples for PF5-FF filled material.

FIG. 21A shows samples for PF5-FF filled material having liquid phase boron added to the free-flowing powder without a printed floor. FIG. 21B shows samples for PF5-FF filled material having liquid phase boron added to the free-flowing powder with a thin printed floor.

FIG. 23A shows the top side image of the samples. FIG. 23B shows the lengthwise side image of the samples.

FIG. 24A shows the top side of the samples. FIG. 24B shows the lengthwise side image of the samples.

FIG. 25A shows sintered slurry filled samples. FIG. 25B shows sintered dry powder-filled samples.

Figure 1:
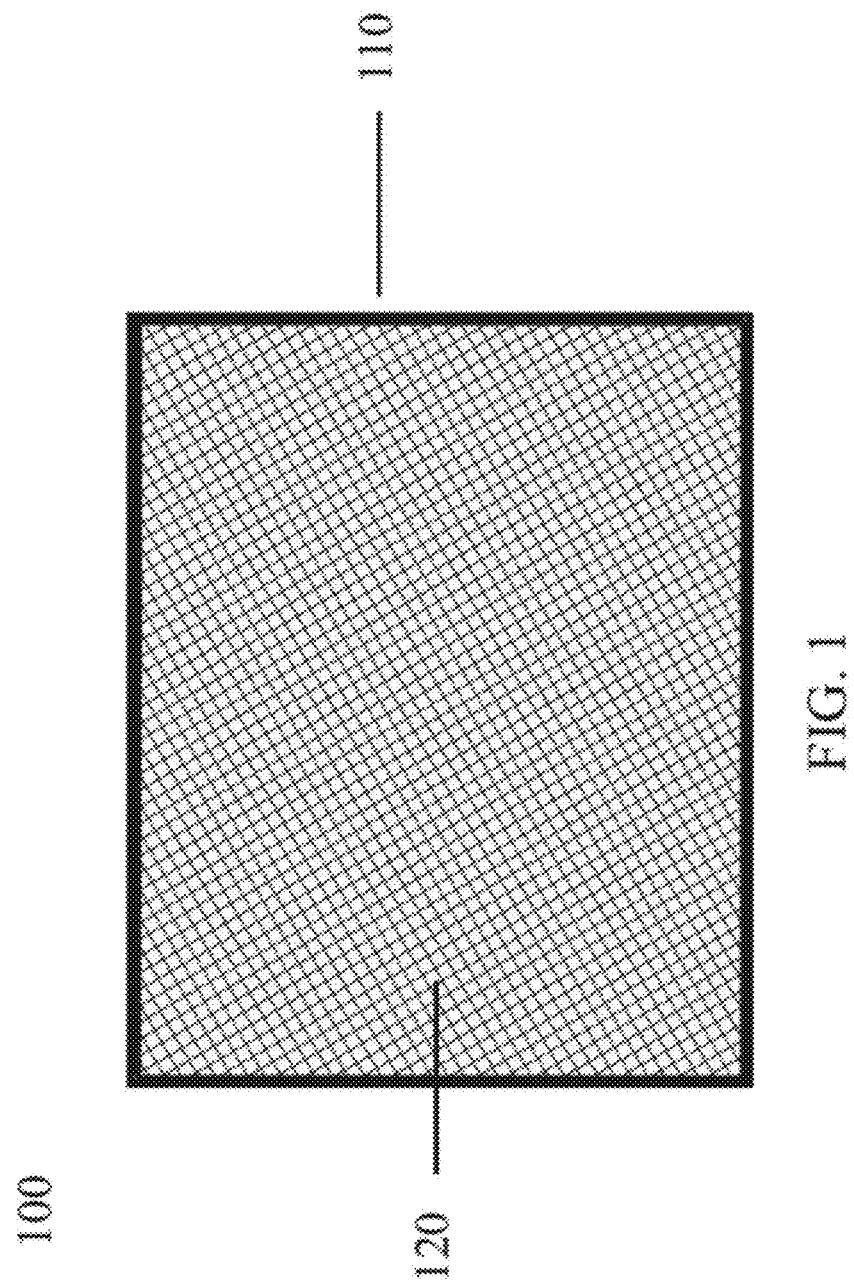
FIG. 1 is a schematic representation illustrating an object or part in accordance with various embodiments of the present disclosure.

The features and advantages of the disclosure are apparent from the detailed specification, and thus, it is intended that the appended claims cover all systems and methods falling within the true spirit and scope of the disclosure. As used herein, the indefinite articles "a" and "an" mean "at least one" or "one or more." Similarly, the use of a plural term does not necessarily denote a plurality unless it is unambiguous in the given context. Words such as "and" or "or" mean "and/or" unless specifically directed otherwise. In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers or steps.

As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Many methodologies described herein include a step of "determining." Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

As used herein, the term "substantially," and grammatic equivalents, refer to the qualitative condition of exhibiting total or near-total extent or degree of a characteristic or property of interest. One of ordinary skill in the art will understand that chemical phenomena rarely, if ever, go to completion and/or proceed to completeness or achieve or avoid an absolute result.

DETAILED DESCRIPTION

Among other things, the present disclosure provides composite metal materials, objects, structures, parts, molds, and dies. Dies and die inserts as provided herein may be useful with metal working processes and metal forming processes. Methods for manufacturing dies are also disclosed herein. Various embodiments according to the present disclosure are described in detail herein.

In subtractive manufacturing, three-dimensional (3D) objects are manufactured by cutting away material from an initial block (or other shape) of material. For example, computer numeric controlled (CNC) machines may be initialized and tuned by an operator to create a particular part. Specifically, the operator may supply a program (e.g., using G-code) that instructs the machine how to make the part. An input material larger than the desired part is provided to the machine. The machine's tool (or multiple tools, depending on the machine) carve away the material, according to the program, to reveal the shape of the specified part.

In such traditional subtractive manufacturing, removing material from a solid block presents numerous issues. First, carving metal is a time and labor-intensive process that requires a tool to cut and wear on some other softer metal material. Second, designing and pathing is a challenge in view of the limitations presented by line of sight in material removal.

Additive manufacturing, sometimes more generally known as three-dimensional printing, refers to a class of technologies for the direct fabrication of physical products from a three-dimensional computer model by a layered manufacturing process. In contrast to material removal processes in traditional subtractive manufacturing, the three-dimensional printing process adds material. In additive manufacturing, 3D parts are manufactured by adding layer-upon-layer of material. For example, an additive manufacturing-based 3D printing device can create a 3D part, based on a digital representation of the part, by depositing a part material along toolpaths in a layer-by-layer manner. This process can enable the direct printing of products with extremely complex geometry.

Fused Deposition Modeling (FDM) also referred to as Fused Filament Fabrication (FFF) is an example of additive manufacturing technology used for modeling, production, and prototyping. In an FDM, FFF additive manufacturing process, a moving print head extrudes a filament of material onto a print bed or to an object being printed. The print head and/or the print bed can move relative to each other under computer control to define the printed object.

Additive manufacturing of a layer generally involves slicing a two-dimensional layer into a series of layers, that is beads, lines, shells, or slices. The printing of a layer is typically done shell-by-shell until the one or more shells (i.e., a plurality of shells) are complete. For example, each two-dimensional layer may have a number of shells lining a contour, such as a perimeter of a wall. The process of depositing or extruding shells is typically in a machine-controlled manner according to slicing parameters. Additionally, for example, the printing of a subsequent shell may include extruding by tracing along a contour or path defined by a prior printed shell. A result of such a process can be close and highly repeatable extrusion.

Additionally, a fill pattern may be deposited between an inner and an outer perimeter of a wall. Each two-dimensional layer may have a different fill pattern filling the interior of the part.

In a fused deposition additive manufacturing system, a three-dimensional part or model may be printed from a digital representation of the three-dimensional part in a layer-by-layer manner by extruding a flowable part material along toolpaths.

The print head can move in two dimensions to deposit one horizontal plane or a layer of the object. Then, the print head or the print bed can be moved vertically by a small amount to begin another horizontal plane, a new layer of the object. The part material is extruded through an extrusion tip carried by a print head of a three-dimensional printing apparatus, device, or system. Part material is deposited as a sequence of roads on a substrate in a build plane.

Additive manufacturing of an object, for example, a fused deposition additive manufacturing process, involves slicing a three-dimensional object into a plurality of two-dimensional layers that are stacked on top of one another (that is, for example along the z-axis). In an additive manufacturing process, stacking could commence, for example, at a build plate. Generally, printing of the object is done layer-by-layer. Layer-by-layer the layers of the object are formed. The position of the print head relative to the substrate is then incremented along one or more print axes, and the process can then be repeated to form an object, e.g., a three-dimensional part resembling the digital representation.

A layer, for example, a first layer is deposited (i.e., extruded) onto the build surface. That is, for example, a horizontal layer is printed with movement in the X-Y axis. Once this first horizontal layer is completed, a height adjustment is made in the Z axis. Another horizontal layer of is printed with movement in the X-Y axis. Once the next horizontal layer is completed, another height adjustment is made in the Z axis. This process continues, for each layer and layer-by-layer until the object is completed.

The present disclosure includes compositions and composite objects and their use in various applications, including, for example: parts or structures, for example, in molds and dies. Indeed, dies and molds collectively represent the largest segment of the tooling market.

Dies are tools that are used to form a material, usually a metal, in solid state, e.g., stamping dies, forging dies, and the like. Dies may be subject to large, dynamic mechanical loads that can be applied at high temperature, for example when used in closed die forging operations. In many cases, geometric dimensions are on an order of inches in thickness, length, and width.

For additive metal FDM extrusion printing, including washing and sintering, to be practical as far as manufacturing time is concerned, larger parts have to be printed using infill pattern taking most of a part volume, with only outer shell printed as a solid material. When compared with subtractively manufactured parts machined out of solid steel, strength and stiffness is compromised.

Moreover, when a fill pattern is deposited between an inner and an outer perimeter of a wall, the infill may include spaces or silos, such that these geometries are opened. The present disclosure envisions preparing infill structures in dies and filling the empty volume inside the structure of infill of the printed part not taken up by an infill pattern with material. Specifically, in certain embodiments, a dry metal powder is vibration-packed into an infilled part, such as a die.

Fine dry spherical powder packs well. Upon sintering, resultant parts exhibit a density that is greater than 95% of the theoretical predicted density using packed spherical powder. From a practical perspective, many dies and die inserts usually have a rectangular shape that could be printed opened facing and exposing the internal infill pattern. The geometry of the infill pattern could be a hex, i.e., hexagonal, pattern that looks like a honeycomb, with parallel hex silos vertically oriented, so that it would be easy to fill them with dry steel powder.

A powder filling operation may be performed, for example, when the part is in a brown state, that is after a printed part is washed in solvent to remove wax component of the polymer. In that case, there should be no problem with sintering of the dry powder-filled filled part, since both the brown printed part and the dry fill powder would not impede a flow of gases that are formed during brown part debinding. In some aspects, a process of forming large near fully dense dies may be achieved with minimum additional time and/or effort.

Composite Objects

In some embodiments, the present disclosure provides compositions and composites of metal. In some aspects, metal composites include one or more metals in a composite structure or an object. In some aspects, the composite structure includes an outer shell of at least one metal. In some aspects, the outer shell of the composite structure defines a volume of the structure or object.

In some aspects, the outer shell of the composite structure is or includes layers of a first metal. Metals suitable for printing in this manner include aluminum, copper, stainless steels, e.g., 17-4, 316, titanium, tool steels, e.g. A2, D2, Inconel, and/or alloys and other metals resistant to oxidation at both high and low temperatures, e.g., amorphous metal.

In some aspects, the outer shell defines a volume within the shell. The outer shell is made of or includes the first metal. In some aspects, the volume may be occupied by an infill. In some aspects, the volume is at least partial occupied by an infill. The infill is made of or includes the first metal. FIG. 1 is a schematic representation illustrating a portion of a volume of an object 110. An outer shell 110 is shown bordering an infill section 120. The outer shell 110 and infill section 120 include or made of the first metal.

In some aspects, the infill is or includes a pattern having a repeated geometric structure within the volume. In some aspects, the infill is defined or characterized by the amount, density, or percentage of the volume occupied. In some aspects, the infill is between about 0% and about 100%. In some aspects, the infill is about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, and about 100%.

In some aspects, the internal structure of the solid bodies herein may be 3D printed with porous, cellular, or hollow infill patterns. In some aspects, the patterns are repeating patterns having geometric shapes. In some aspects, the geometric patterns can include, for example, diamond, gyroid, hexagonal, honeycomb, rectangle, square, triangle, and other polygonal shapes.

In some aspects, structures are printed without a roof. In certain instances, when printed without a roof, the open cell infill structures, e.g., arranged patterns of vertical silos or spaces, are exposed.

In some aspects, the metal compositions include at least a second metal. The second metal can be a dry powder fill added, infused, poured into the infill of the interior volume of the shell of the part. The second metal, the dry powder may be filled and vibrated into the vertical silos within the infill of the interior volume of the shell of the part.

In some aspects, powders are characterized by their size, morphology, chemical composition, flow, thermal properties, and/or density. The particles of the powder are of a substantially uniform density and composition having a particle size distribution of about 0.1 μm to 100 μm. The morphology of particles determines how well they pack together. How well the particles pack can determine the minimum layer thickness and/or density of a resultant object. Metal powders typically are not pure and may contain other materials, i.e., different elements, such that when combined and used produce different final part material properties in bulk. Thus, purity and composition may be factors in the final part's mechanical properties. How well a powder flows and the ability to flow and pack is a function of interparticle friction. As surface area increases, friction increases, which results in a less efficient flow and packing.

In some aspects, the dry powder can be any dry powder having capable of flowing like a fluid, such a liquid metal. In some aspects, the dry powder may be of, from, or including a metal suitable for sintering including, for example aluminum, copper, steel, stainless steel, titanium, tool steels, and/or alloys and other metals resistant to oxidation at both high and low temperatures, e.g., amorphous metal.

In some aspects, the metal powder is a dry metal powder. In some aspects, the metal powder is a free-flow (FF) powder, for example, such as one having a thermoset, thermoplastic, or UV curable powder coating.

Figure 2:
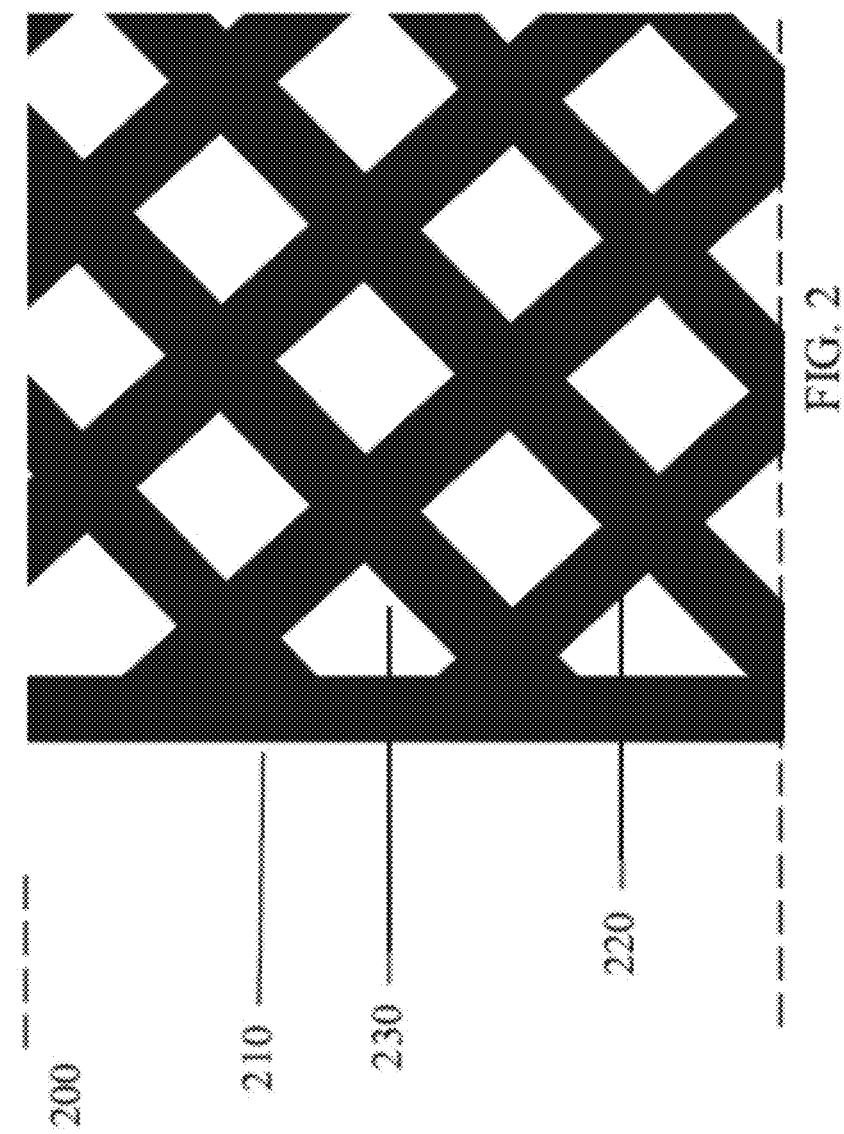
FIG. 2 is a schematic representation illustrating an object or part in accordance with other various embodiments of the present disclosure.

FIG. 2 is a schematic representation illustrating a portion of a volume of an object 200. An outer shell 210 is shown bordering the portion of the volume of the object 200. An infill 220 is shown defining a pattern within the border 210 of the portion of the volume of the object 200. The outer shell 210 and an infill section 220 include or made of the first metal. The outer shell 210 and an infill section 220 define vertical silos defined by a volume capable of receiving and holding a dry powder. The vertical silos area 230 surrounding the infill section is shown infiltrated with a dry powder.

In some aspects, a dry powder substantially fills all or nearly all of the empty volume of the vertical silos of the portion of the volume of the object 200. In some aspects, the dry powder substantially fills voids and/or imperfections present within in the outer shell and/or the infill portions of the first metal.

In some aspects, the composite structure is made of or manufactured from more than one metal. For example, the first metal may be a powder-based filament tool steel and the second material may be a dry powdered tool steel. In another example, the first metal may be a powder-based filament stainless steel and the second material may be a dry powdered stainless steel.

In some aspects, the composite structures are characterized by their properties. In some aspects, sintered composite structures as provided herein form strong, stiff dies that may have dimensions on the order of about an inch in length, thickness, and width. In some aspects, sintered composite structures as provided herein include forming strong, stiff dies that may have dimensions on the order of several inches or more each in length, thickness, and width.

In some aspects, sintered composite structures as provided herein are useful for manufacturing dies, such as solid steel stamping dies or forging dies yielding composites having enhanced thermal conductivity and resistivity, enhanced strength, and enhanced modulus when compared with additively formed primarily single metal materials and structures formed from subtractive methods. In some aspects, when sintered composite structures that are formed of an additive outer shell defining a volume with a patterned infill therein having a dry powder deposited within the shell may exhibit a build speed of about ten times faster than other methods of manufacturing. In some aspects, dies as provided herein may be formed as strong as possible. In some aspects, high strength dies may not be optimized for peak thermal properties.

Methods of Making Composite Objects

The present disclosure also provides methods of forming composite structures and objects as taught herein. Methods include printing a metal object having a substantially solid shell and a patterned infill within the volume of the shell. Methods further include washing the object with a debinding solvent to form a brown part. Following brown part formation, steps may include infiltrating the volume with a dry powder to make the metal composite object or part. After infiltrating with powder, steps may include sinter to form an object, such as a die.

Figure 3:
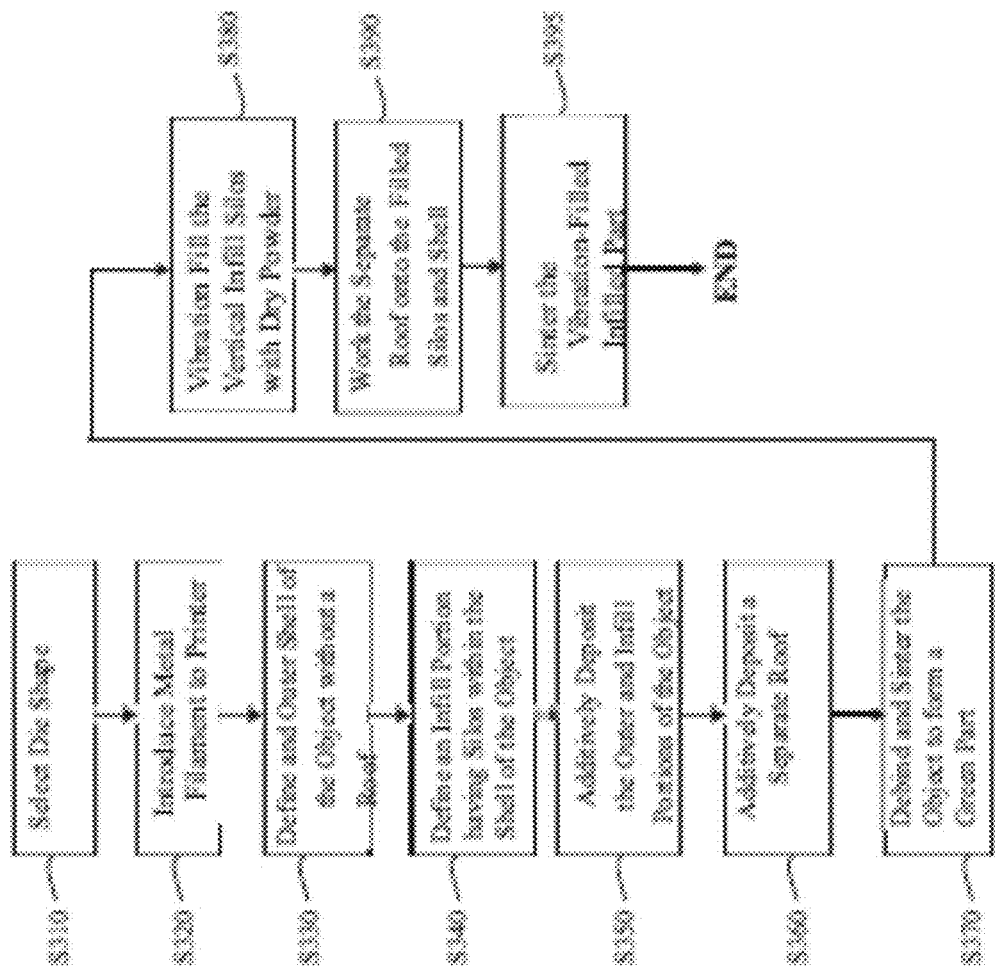
FIG. 3 is a flow chart for performing 3D-printing an object and vibration filling the object to form a composite, in accordance with various embodiments of the present disclosure.

FIG. 3 is a flow chart for forming a composite object by 3D-printing of a shell and infiltrating the internal volume of the shell with a dry powder to form an object, that is, the composite metal in accordance with various embodiments of the present disclosure.

FIG. 3 at S310 includes selecting a shape of the die, for example, rectangular. FIG. 3 at S320 includes introducing a metal filament, for example a tool steel, H13 filament. The composite object is defined, S330 by its outer shell and the interior volume to the shell. The interior volume is further defined, S340 by an infill structure that is characterized by vertical infill silos. The vertical infill silos are capable of holding a dry powder.

The methods further include depositing the metal along a toolpath to form an outer shell of the object, S330. The methods further include a step of depositing an interior volume of the object, S340. The interior volume of the object includes the vertical infill silos within the interior volume of the composite object.

In some aspects, methods further include depositing infill in a pattern having a repeated geometric structure within the volume. In some aspects, the silos are defined or characterized by the amount, density, or percentage of the volume occupied. In some aspects, the infill is between about 0% and about 100%. In some aspects, the infill is about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, and about 100%.

In some aspects, methods further include depositing an infill patterns. In some aspects, the patterns are repeating patterns with the silos having repeating geometric shapes. In some aspects, the geometric patterns can include, for example, diamond, gyroid, hexagonal, honeycomb, rectangle, square, triangle, and other polygonal shapes.

In some aspects, methods include layer by layer printing of the outer shell and infill as disclosed herein. In some aspects, the object shell, interior volume, and infill are formed layer-by-layer as the object is printed, S350.

In some aspects, methods include a step of printing a top layer or roof layer, S360. In some aspects, methods include a step of separately printing a top layer or roof layer. In some aspects, a surface of the object is not printed or left open to expose the open cells. In some aspects, the surface is separately printed.

The resultant object, a green part, is prepared for dry powder infiltration. Prior to infiltration the composite structures and objects are debound via washing the deposited object in a debinding solvent, S370. The object that is formed, i.e., a brown part, is ready for the dry powder to be added, deposited, infiltrated, or filled.

In some aspects, methods include a step of adding, filling, and/or pouring a dry metal powder onto an open face of the object. The dry powder is vibration filled, S380 over the composite object and allowed to infiltrate or fill into the vertical infill silos. In some aspects, methods include a step of vibrating the part holding an excess of powder so that powder can asymptotically settle into the silos. The vibrating can be accomplished, for example, with a vibration table. FIG. 3 at S390 includes placing a roof to cover the face of the object.

The container housing the object is placed into a sintering furnace and heated to between 1150° C. about 1300° C. in argon reducing atmosphere, S395.

In some aspects, methods further include sintering at a temperature between about 700° C. and 1600° C. In some aspects, methods include sintering at a temperature of about 750° C., about 800° C., about 850° C., about 900° C., about 950° C., about 1000° C., about 1050° C., about 1100° C., about 1150° C., about 1200° C., about 1250° C., about 1300° C., about 1350° C., about 1400° C., about 1450° C., about 1500° C., about 1550° C., or about 1600° C., or higher.

In some aspects, methods as provided herein include forming strong, stiff dies that may have dimensions on the order of about 0.1 inch, about 0.2 inch, about 0.3 inch, about 0.4 inch, about 0.5 inch, about 0.6 inch, about 0.7 inch, about 0.8 inch, about 0.9 inch, about 1.0 inch, about 1.1 inches, about 1.2 inches, about 1.3 inches, about 1.4 inches, about 1.5 inches, about 1.6 inches, about 1.7 inches, about 1.8 inches, about 1.9 inches, about 2.0 inches, about 2.1 inches, about 2.2 inches, about 2.3 inches, about 2.4 inches, about 2.5 inches, about 2.6 inches, about 2.7 inches, about 2.8 inches, about 2.9 inches, about 3.0 inches, about 3.1 inches, about 3.2 inches, about 3.3 inches, about 3.4 inches, about 3.5 inches, about 3.6 inches, about 3.7 inches, about 3.8 inches, about 3.9 inches, about 4.0 inches, about 4.1 inches, about 4.2 inches, about 4.3 inches, about 4.4 inches, about 4.5 inches, about 4.6 inches, about 4.7 inches, about 4.8 inches, about 4.9 inches, about 5.0 inches, about 5.1 inches, about 5.2 inches, about 5.3 inches, about 5.4 inches, about 5.5 inches, about 5.6 inches, about 5.7 inches, about 5.8 inches, about 5.9 inches, about 6.0 inches, about 6.1 inches, about 6.2 inches, about 6.3 inches, about 6.4 inches, about 6.5 inches, about 6.6 inches, about 6.7 inches, about 6.8 inches, about 6.9 inches, about 7.0 inches, about 7.1 inches, about 7.2 inches, about 7.3 inches, about 7.4 inches, about 7.5 inches, about 7.6 inches, about 7.7 inches, about 7.8 inches, about 7.9 inches, about 8.0 inches, about 9.1 inches, about 9.2 inches, about 9.3 inches, about 9.4 inches, about 9.5 inches, about 9.6 inches, about 9.7 inches, about 9.8 inches, about 9.9 inches, about 10.0 inches, about 10.5 inches, about 11.0 inches, about 11.5 inches, about 12.0 inches, about 12.5 inches, about 13.0 inches, about 13.5 inches, about 14.0 inches, about 14.5 inches, about 15.0 inches, about 15.5 inches, about 16.0 inches, about 16.5 inches, about 17.0 inches, about 17.5 inches, about 18.0 inches, about 18.5 inches, about 19.0 inches, about 19.5 inches, about 20.0 inches, about 20.5 inches, or more.

In some aspects, methods as provided herein include forming strong, stiff dies that that may have any of the above dimensions without evidence of cracking, deformation, or distortion.

In some aspects, methods as provided herein include forming strong, stiff dies that may have any of the above dimensions with high density, such that the relative density is at least about 90% to about 99% of the theoretical wrought density. In some aspects, the density is about 90.5%, about 91%, is about 91.5%, about 92%, is about 92.5%, about 93%, is about 93.5%, about 94%, about 94.5%, about 95%, about 95.5%, about 96%, about 96.5%, about 97%, about 97.5%, about 98%, about 98.5%, about 99%, or about 99.5% of the theoretical wrought density.

In some aspects, methods as provided herein include forming strong, stiff dies that are characterized in that they exhibit near theoretical maximum values for tensile strength, fatigue strength, elongation, and impact strength as the composite structure's relative density approaches a theoretical maximum. In some aspects, achieving theoretical maximum values as noted above, includes optimizing and/or varying the sintering temperature, sintering pressure, sintering time, % soluble binder, and % pyrolytic binder. In some aspects, achieving theoretical maximum values as noted above, includes matching of morphology, grain/particle size between the deposited filament and the filled powder. In some aspects, achieving theoretical maximum values, as noted above, includes varying the volume fraction of the powder. In some aspects, the present disclosure includes varying these properties to optimize the properties of a resultant sintered composite part as provided herein.

Applications

Dies can be useful when preparing material via a metal forming process. In solid state metal forming processes, for example, dies can be used for stamping and forging. When used to form metal in the solid state it should be understood that such dies are likely to be subjected to large mechanical loads that are usually dynamic processes. Additionally, dies as disclosed are sometimes subjected to loads that are applied at high temperature, such as in closed die forging operations.

Typical geometric dimensions of dies are on an order of inches in thickness, length, and width. Additive manufacturing via FFF 3D printing, debinding, and sintering, however, is not particularly suited for making strong, stiff dies of such dimensions. For parts or objects having larger dimensions; the print, wash and sinter times can be prohibitive. Additive manufacturing of large solid parts has drawbacks including increased printing and debinding times. First, it takes a long time to 3D print large scale fully solid objects using FDM technology. Second, once the green part of the tool or die is printed, it takes an even longer time to wash.

To be practical from a perspective of manufacturing time, larger parts made from an additive manufacturing process including FFF 3D printing, debinding, and sintering may benefit from being printed using an infill pattern. In cases where an infill pattern is used, a percentage of the interior volume is occupied by printed material and a percentage taking most of a part volume, with only outer shell printed as a solid material. In such circumstances, the final part strength and stiffness may be compromised, particularly when these are compared to die machined out of a solid piece of metal, e.g., steel.

In response, to reduce metal filament material usage and to minimize both the print and wash times, additive manufacturing processing has employed the use of infill patterns to make or print large parts. Infill patterns print only a percentage of the volume of a fully solid object during printing. Infills therefore serve the intended purpose, that is, they provide interior support to the outer shell of the part while using less material. By using less material, the part costs less in metal filament and importantly takes significantly less time to print and wash.

The present disclosure encompasses a recognition that filling an empty volume, such as an open cell infill pattern inside a printed part with a vibration-packed dry metal powder and sintering such a powder filled object can exhibit a density that is 95% or greater than that of the theoretical density for a solid part. A fine dry spherical powder can pack very well such that upon sintering resulting parts near solid parts are formed.

The present disclosure further encompasses a recognition that objects having an infill pattern can be printed with an open face exposing the internal infill pattern. In that way, the dry metal powder may be added, filled, and/or poured into open silos of the open cell infill through the open face. Indeed, many dies or die inserts, for example, can be rectangular-shaped blocks, and therefore easy to print with an open face exposing the internal infill pattern.

The present disclosure does not envision limiting a shape or percent infill of the infill pattern. An infill pattern that could be tried first is a hex, i.e., hexagonal, pattern that looks like a honeycomb, with parallel hex silos oriented vertically, so that it would be easy to fill them with dry steel powder. A powder filling operation may be performed in a brown state, that is, after the object is printed and washed in a debinding solvent to remove a wax component of the polymer. In such cases, there should be no problem with sintering of the dry powder-filled part, since both the brown printed part and the dry fill powder would not impede flow of gases formed during brown part debinding. An application of this technology would enable additive manufacturing of a large near-fully-dense dies with minimum additional time and effort when compare with FFF metal parts.

Figure 4:
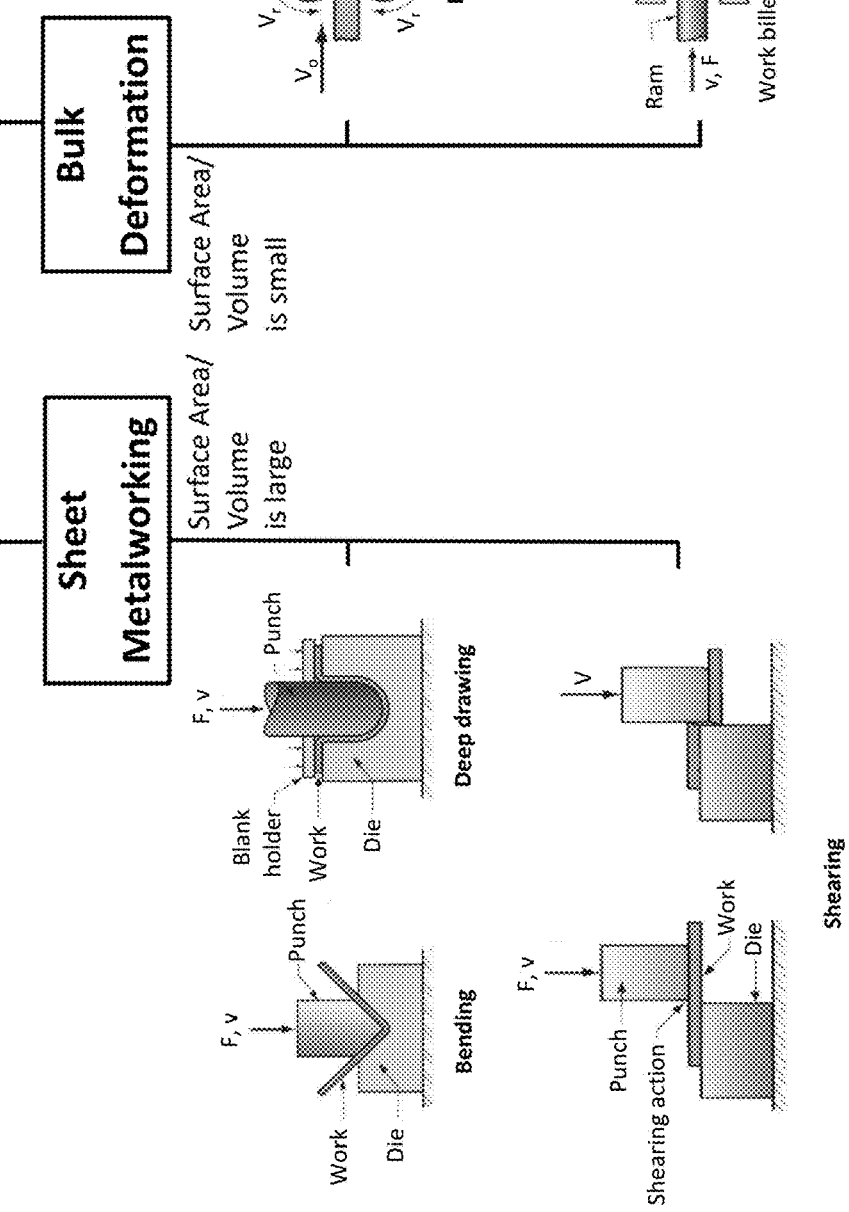
FIG. 4 is a schematic representation showing the process flow for the metal forming process.
Figure 5A:
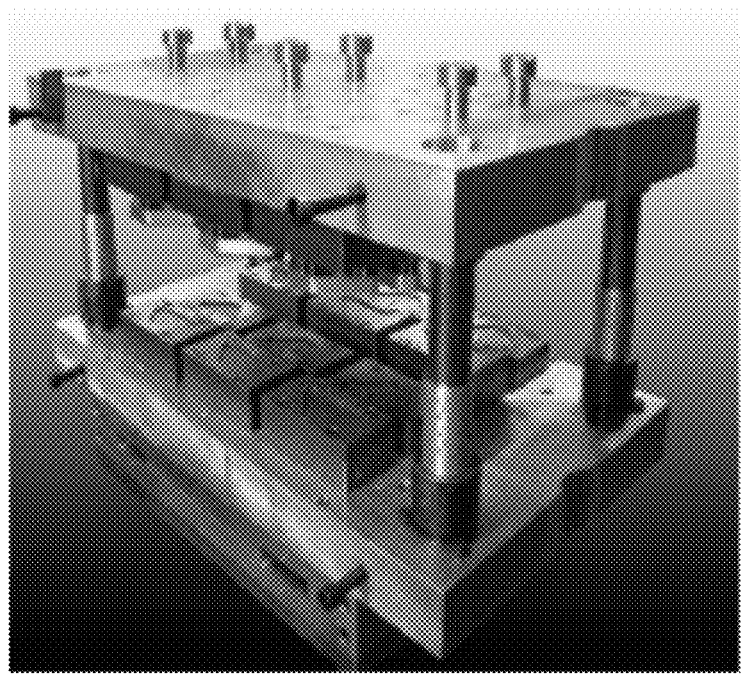
FIGS. 5A-5B are images showing metal forming dies.
Figure 5B:
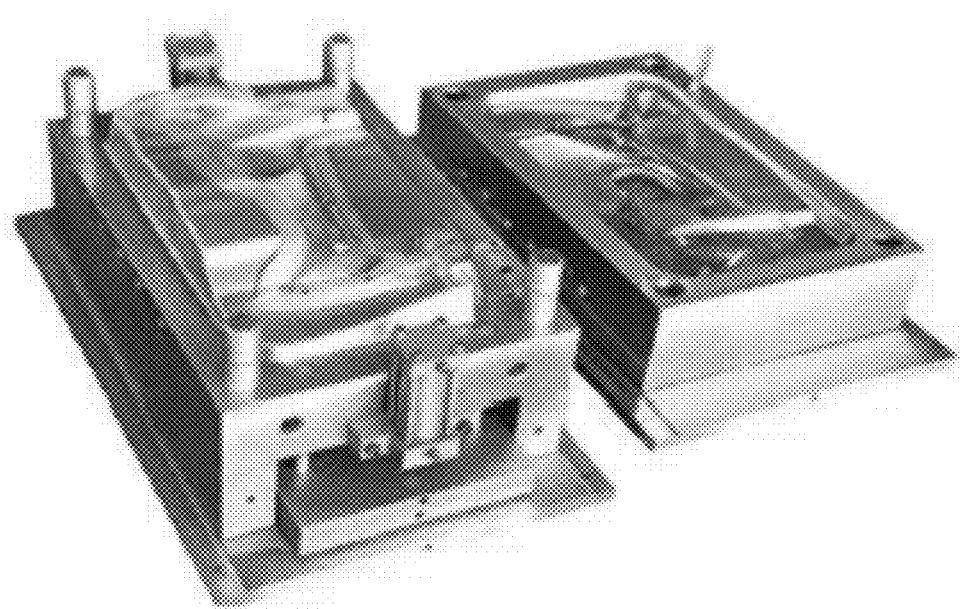

FIG. 4 is an image illustrating metal forming process as envisioned by the present disclosure. FIG. 4 on the left side shows sheet metalworking, including using metal dies to perform processes such as bending, deep drawing, and shearing. In these sheet metalworking applications, the surface area and/or volume of the objects is large. FIG. 4 on the right side shows bulk deformation, including using metal dies to perform processes such as rolling, forging, extruding, and wire drawing. In these bulk deforming processes, the surface area and/or volume of the objects is small. FIG. 5A shows an image of a sheet metalworking die. FIG. 5B shows an image of a bulk deformation die.

Figure 6A:
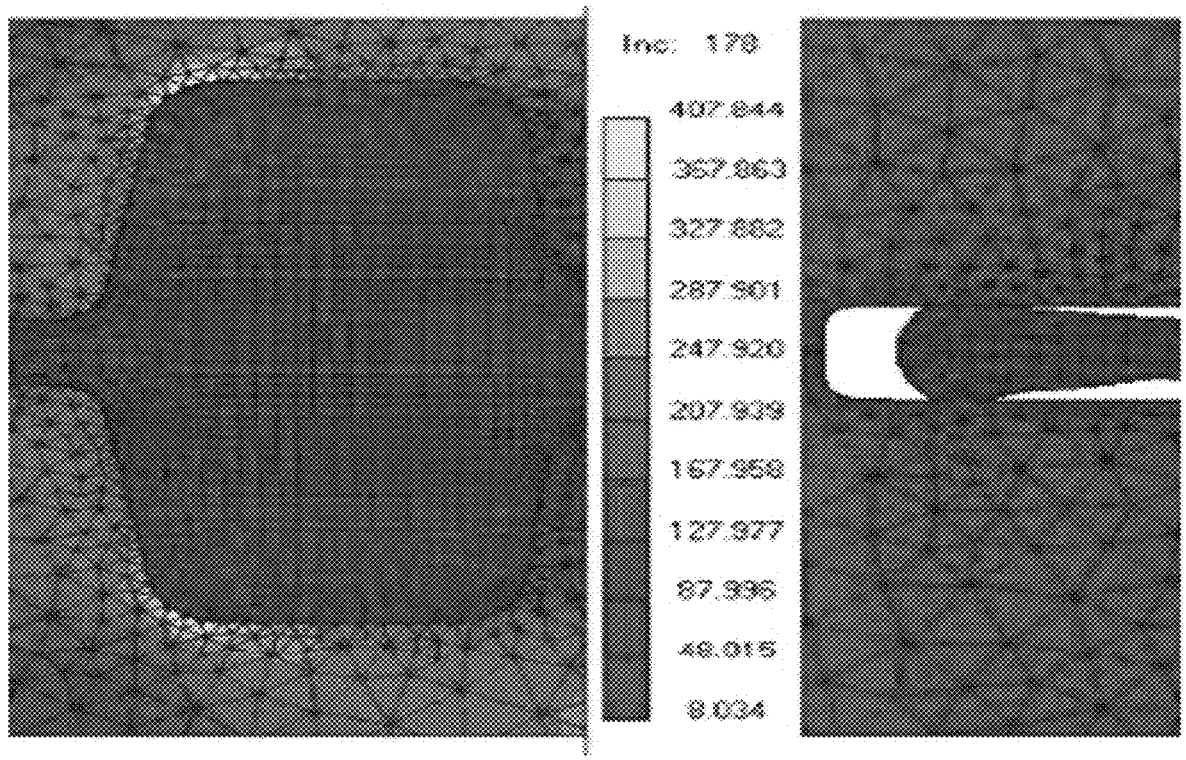
FIGS. 6A-6B are images illustrating stresses on dies.
Figure 6B:
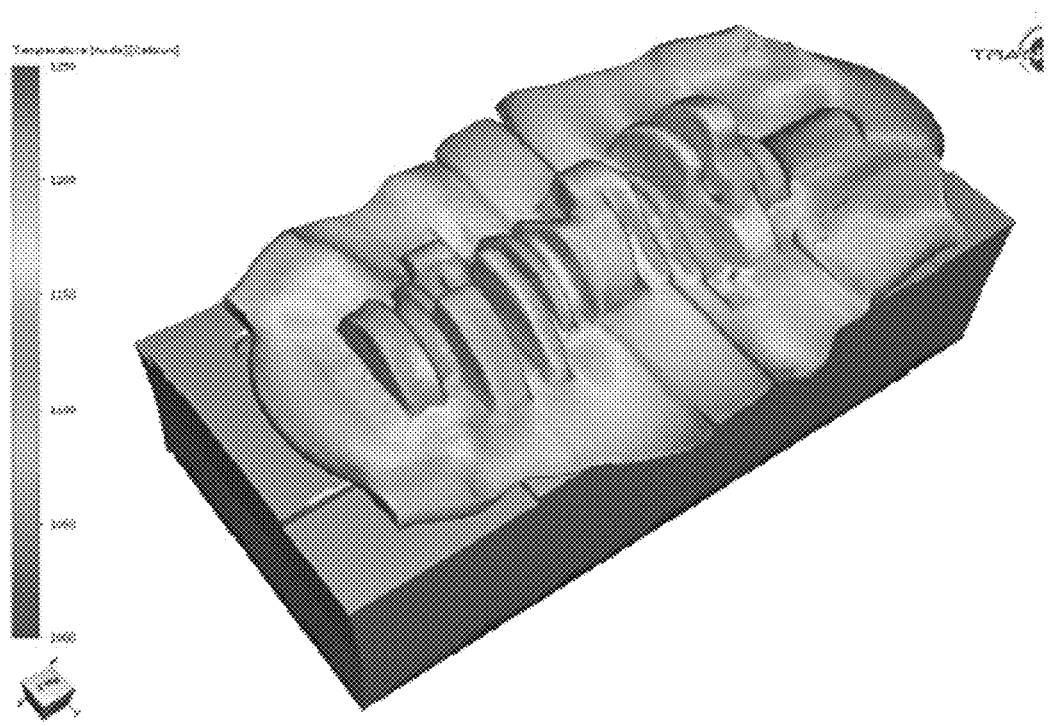

FIGS. 6A-6B show "heat maps" illustrating the stress placed on dies during their use and to emphasize the need for strength. FIG. 6A shows representative mechanical stress and illustrates that dies should be of sufficient strength to withstand these applied stresses. FIG. 6B shows representative thermal stress and illustrates that dies should both resist heat well and conduct heat well.

The present disclosure encompasses a recognition that traditional powder metallurgy techniques do not account for the capability of open cell infill parts to mimic or nearly replicate characteristics or properties of wrought materials in dies. Enhancements of FFF and Free-flow powder technology as shown, for example, in below Table 1.

TABLE 1

Comparison in part properties between legacy forming processes and powder processes as disclosed herein

| Feature Enhancement in Die | Legacy Powder Metallurgy | Adding dry metal powder to Silos of an Open Cell Infill | Enabling Process |
| --- | --- | --- | --- |
| Uniformity | LOW<br>Difficult to maintain uniformity over continuous part volume | HIGH<br>Part volume is broken up into discrete silos. | FFF |
| Die Complexity | LOW<br>Sintering of the part occurs in a mold. Sintered Part must be Extracted therefrom. | HIGH<br>The sintering mold/outer shell is a portion of the part and is sintered with the part. | FFF |
| Ability to Fill Fine Features | LOW<br>Non-spherical; non-free-flow powders are used. | HIGH<br>Spherical; free-flow powders are used. | Free-Flow Powder |
| Sintering Process and Ability to Control Defects | LOW<br>An uneven compaction density leads to high probability of cracking. | HIGH<br>Silos create small uniform sintering volume that reduce or eliminate cracks. | FFF |

EXAMPLES

The following examples illustrate some embodiments and aspects of the disclosure. It will be apparent to those skilled in the relevant art that various modifications, additions, substitutions, and the like can be performed without altering the spirit or scope of the disclosure, and such modifications and variations are encompassed within the scope of the disclosure as defined in the claims which follow. The following examples do not in any way limit the disclosure.

Example 1

The present Example describes a method of forming a powder filled die in accordance with an embodiment of the present disclosure. More specifically, a method of forming a powder filled die is performed by powder filling of a rectangular printed block, e.g., a block of 17-4 steel from filament filled with PF5-FF powder and sintering the printed and filled block.

Materials and Methods

A rectangular block having a 75 mm×50 mm×12.5 mm (final sintered part dimensions) was selected.

Figure 7:
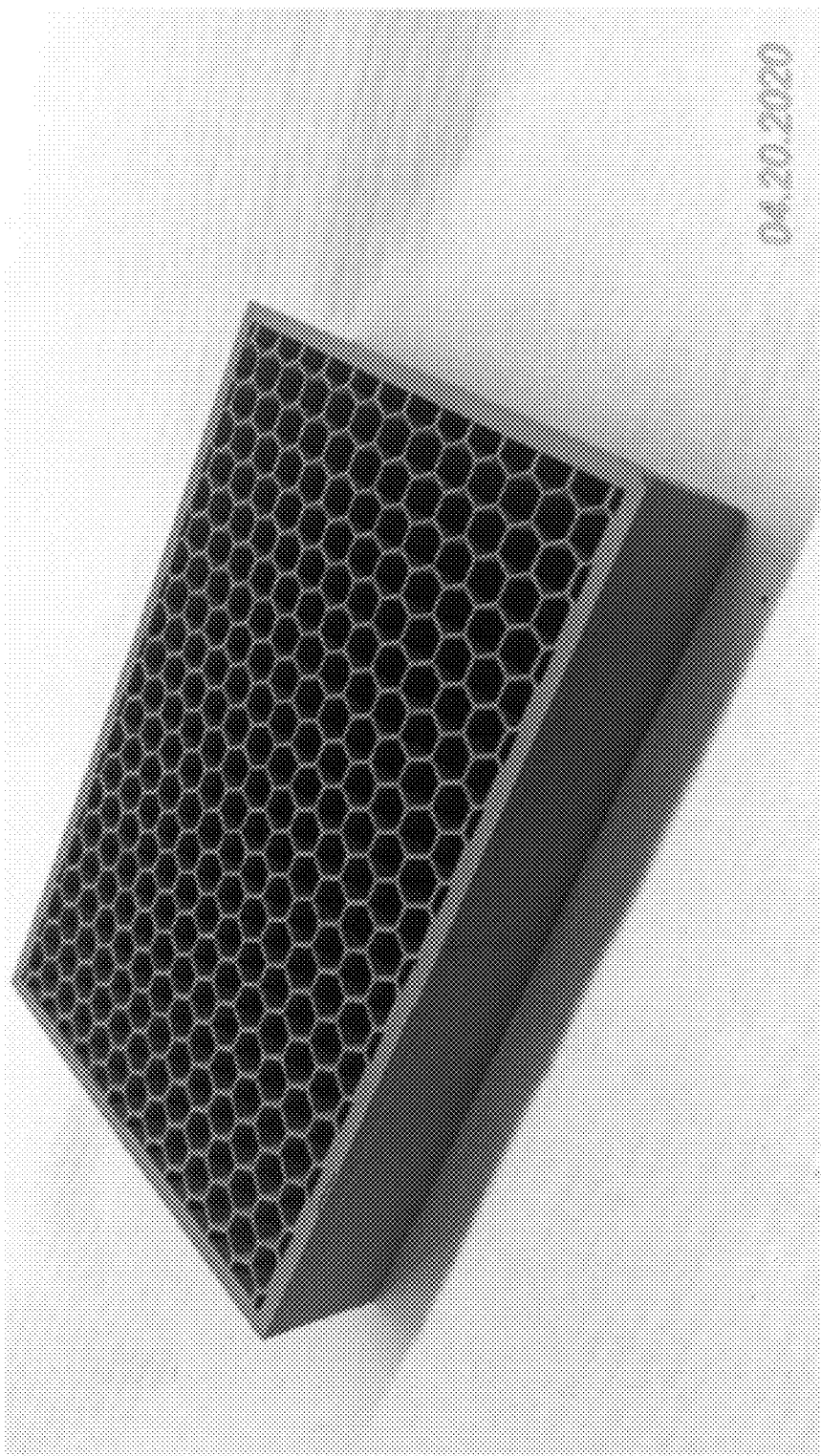
FIG. 7 is an image of an object 3D printed without a roof having an exposed open cell hexagonal infill.

The rectangular block was printed using a MARK-FORGED® Metal X extruding a filament 17-4 filament. An open cell infill was printed having a setting of 30% hex, floor and wall thickness at 1.5 mm. The rectangular block was printed without a roof, i.e., a top cover. As shown in FIG. 7, the rectangular block without the roof was printed by pausing a 25 mm high block print at half height, so that the hex infill is exposed.

Figure 8:
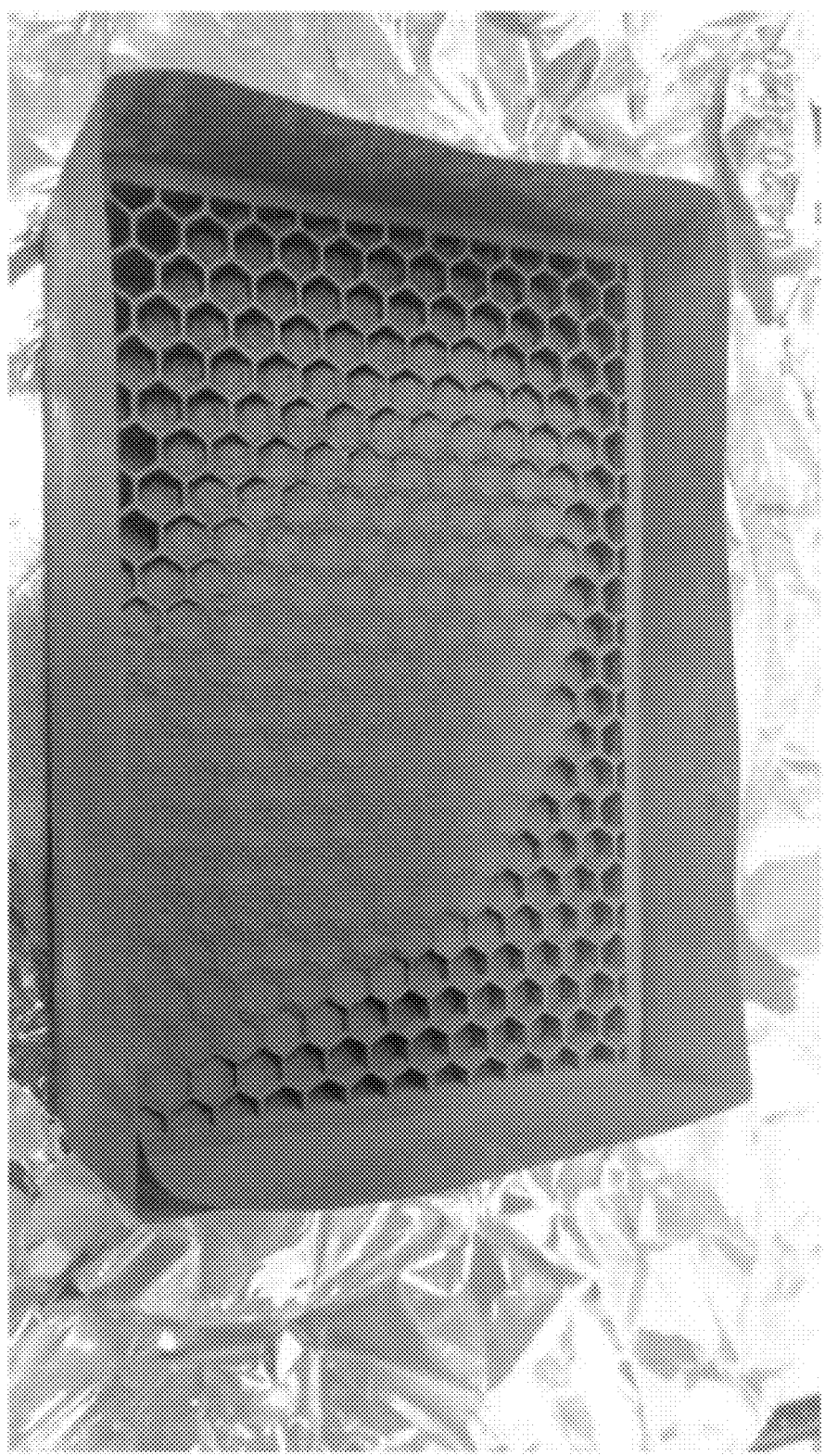
FIG. 8 is an image of the object shown in FIG. 7 as a brown part wrapped and placed on a vibrating table with powder having been fed on top of the block and gradually vibrated into the silos.

The green part was washed to brown state and wrapped. The wrapped block was set atop a vibrating table inside a HEPA air filtration hood. PF5-FF powder was fed portion-by-portion on top of the block and gradually vibrated into the hex infill vertical cavities. The vibration feeding is shown mid-process in FIG. 8.

Powder was added, dumped, filled, poured, and the like on top of the part and vibrated. At the end of the filling and vibration process, an excess of a powder layer was formed on top of the block bound by the tape. The tape was then removed and the excess powder layer was removed using a doctor blade.

The rectangular block was brushed to clean metal powder off its sides and bottom.

The rectangular block was sintered in a MARK-FORGED® Sinter I furnace using a modified 17-4 steel sintering cycle. The modification being higher peak sintering temperature of 1225° C. instead of 1150° C.

Figure 9A:
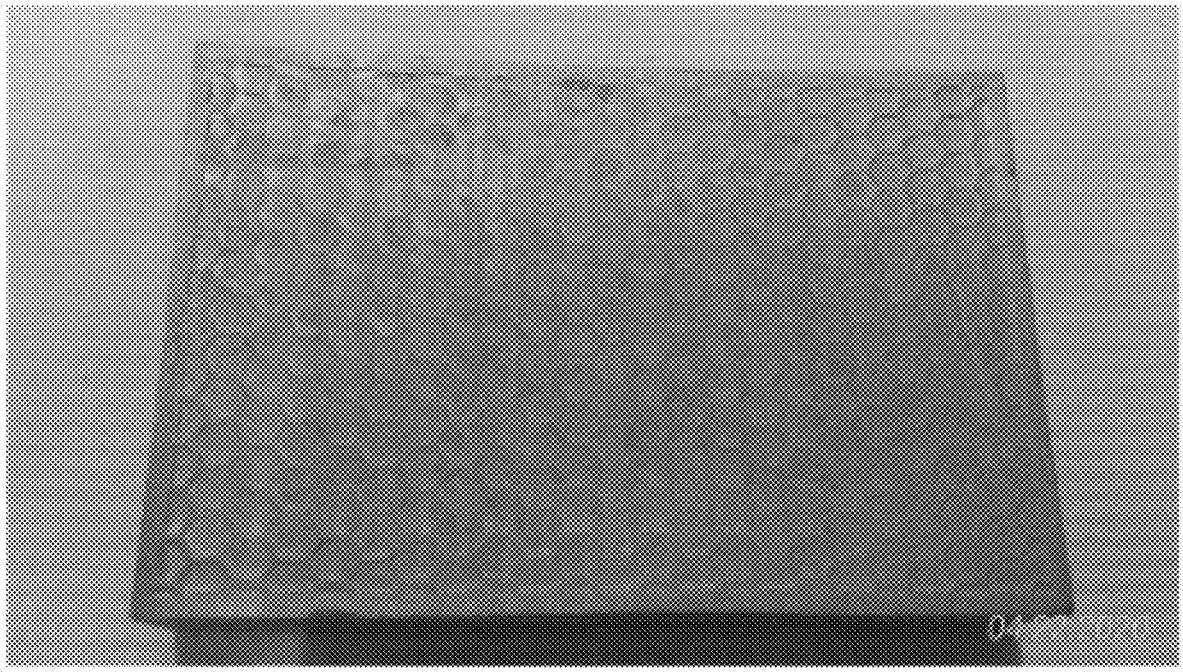
FIGS. 9A-9B are images of the final sintered object shown in FIGS. 7 and 8.
Figure 9B:
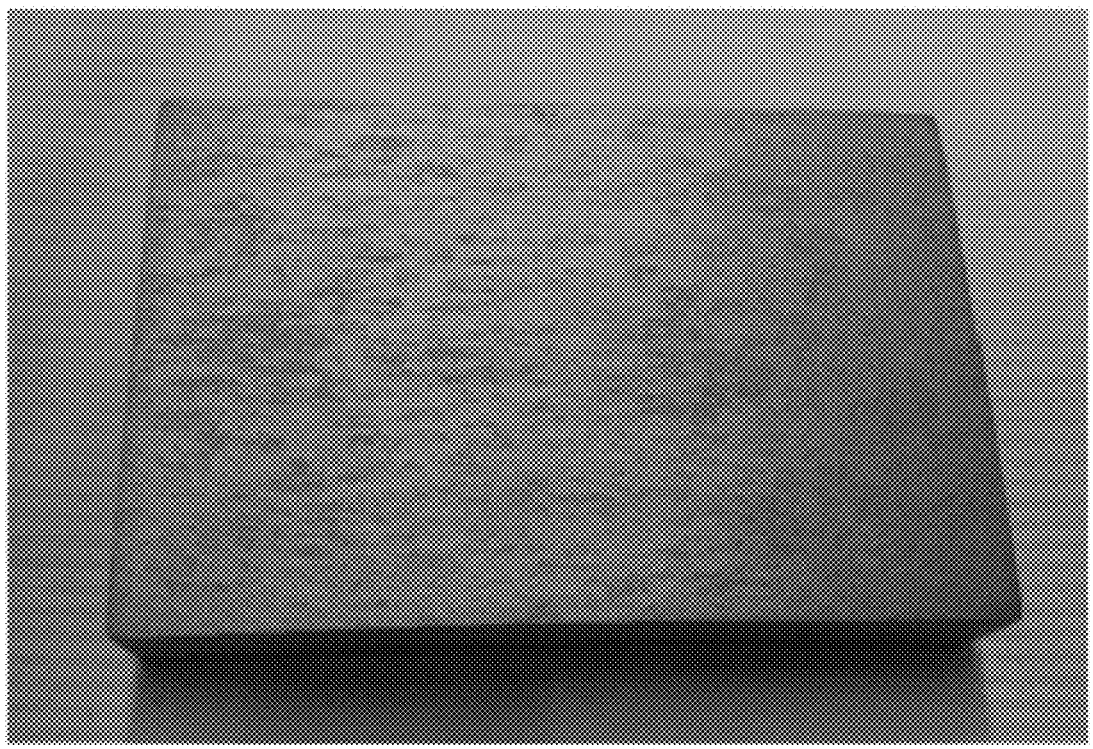

The 75 mm×50 mm×12.5 mm sintered block was measured to have a post sintered mass of 339.19 g. The block was measured to have a post-sintered volume of 45.21 cm$^3$. The sintered block has a density of 7.498 g/cm$^3$ and a theoretical density of 96.13% of 7.80 g/cm$^3$. Images of the final sintered block are shown in FIGS. 9A-9B, top-side (open-cell infill), FIG. 9A and bottom-side, FIG. 9B.

It is concluded that the attempt to sinter a powder-filled printed block was successful reaching over 96% of 17-4 steel theoretical density. It is noted that this density is a composite number with contributions from a printed and sintered shell and infill and a contribution from filled and sintered powder.

Figure 10A:
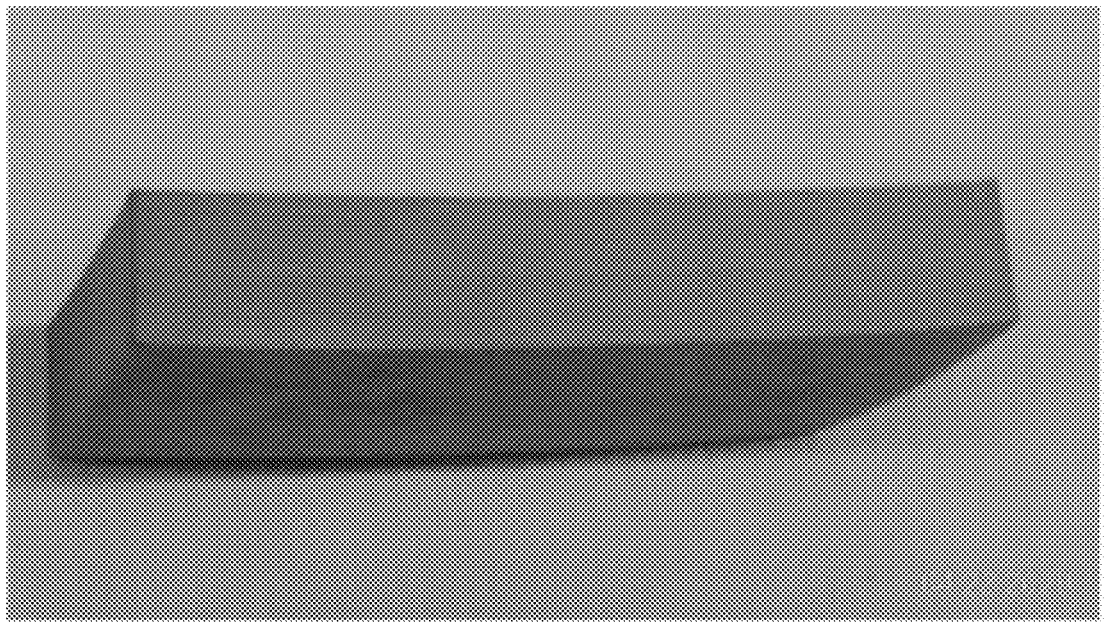
FIGS. 10A-10B are images of the final sintered object shown in FIGS. 7, 8, 9A, and 9B.
Figure 10B:
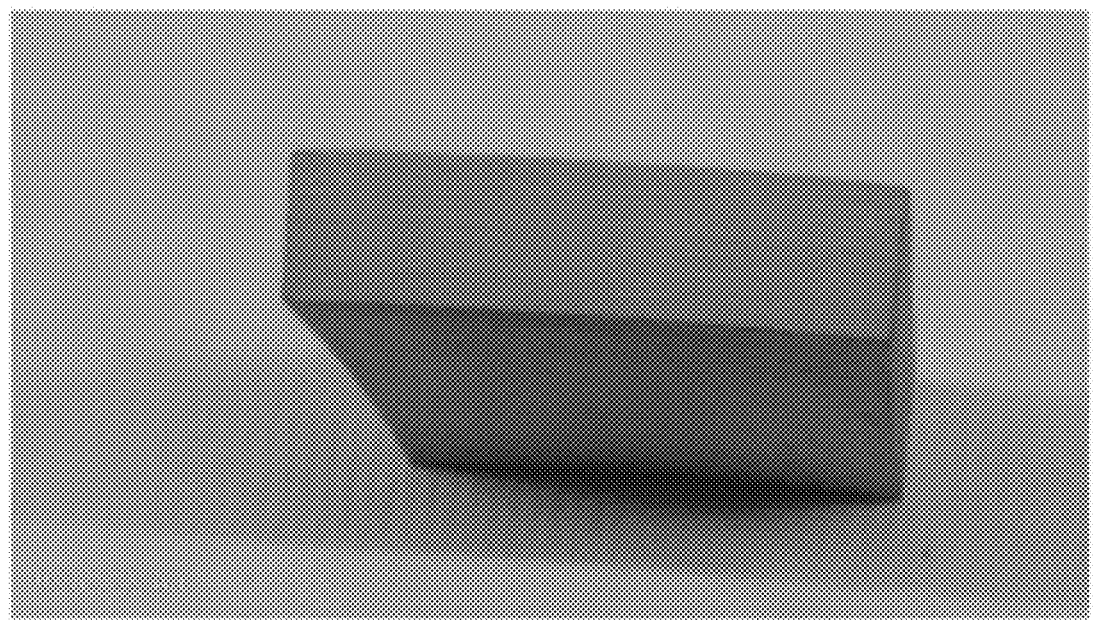

While the block came out greater than 96% dense, it showed evidence of warping, similar to a potato chip after frying. The warping suggests an unbalanced shrinkage during sintering. Images of the final sintered block are shown in FIGS. 10A-10B, with FIG. 10A showing a lengthwise side and FIG. 10B showing a widthwise side. A root cause for the unbalanced shrinkage was that the top cover consisting of a printed and therefore denser packed powder (as compared to vibration tapped powder) was missing during the sintering process.

Example 2

The present Example describes a method of forming a powder filled die in accordance with another embodiment of the present disclosure.

Materials and Methods

The second example discloses powder filling a rectangular block printed from 17-4 steel filament and filled with PF13-FF and PF20-FF powders and sintering the printed and filled block.

In the second attempt at filling and sintering of a printed block, two objectives were pursued. First, to find out an effect of powder size on a block sintered density. Second, to try a technique to avoid block warping during sintering.

Figure 11:
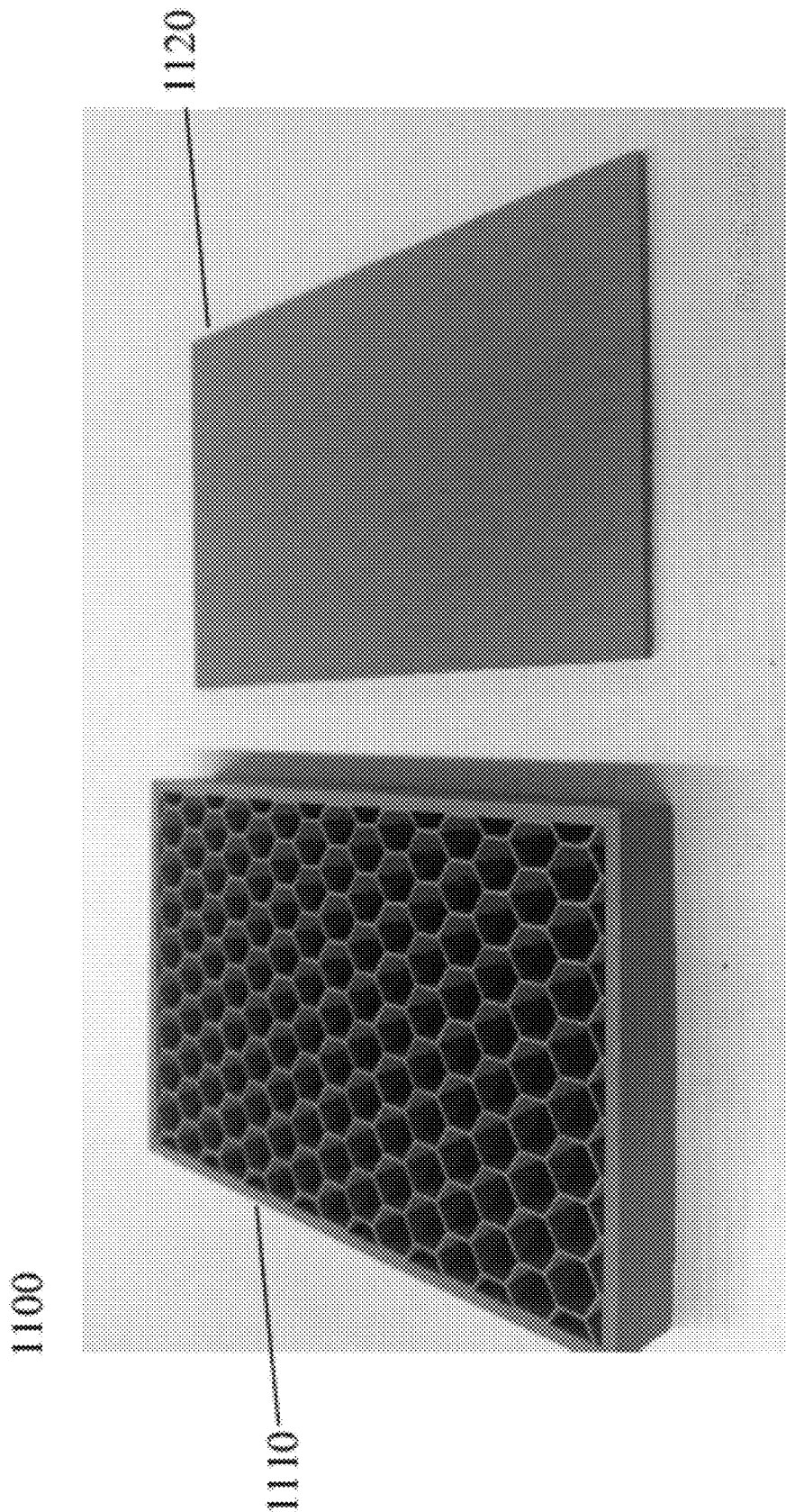
FIG. 11 is an image of the object shown in FIG. 7 printed without a roof and having the hex infill exposed and a separately printed roof.

To achieve the objectives, two 75 mm×50 mm×10 mm (final sintered dimensions) blocks were printed using MF 17-4 steel filament, with wall and floor thicknesses set at 1.51 mm and hex infill at 20%. As shown in FIG. 11, the rectangular block 1100 without the roof was printed by pausing a 25 mm high block print at half height so that the hex infill is exposed. The rectangular block 1110 was printed without a roof, i.e., a top cover. Fully filled cover of 75 mm×50 mm×1.5 mm dimensions were separately printed from the blocks.

Figure 12:
FIG. 12 is an image of the object shown in FIG. 11 as a brown-part that is filled a dry metal powder having a cover or roof that is sitting flush on top of the object.

The first block was filled with PF13-FF powder that was fed portion-by-portion on top of the block and gradually vibrated into the hex infill vertical cavities. Powder was added, dumped, filled, poured, and the like on top of the block and vibrated. At the end of this process, an excess of a powder layer was formed on top of the block bound by the tape. The tape was then removed, and the excess powder layer was removed using a doctor blade. The separately printed cover was worked into the block until the top cover was sitting flush with the rectangular block surface, as shown in FIG. 12. The block was then flipped up-side-down and put on a ceramic setter plate for sintering in a MARK-FORGED® Sinter I furnace.

Figure 13:
FIG. 13 is an image of two rectangular objects, each filled with a dry metal powder. One of the objects contains PF13-FF powder and a cover or roof that is sitting flush on top of the block. The other object contains PF20-FF powder and is shown without a cover.

The second block was filled with PF20-FF powder was fed portion-by-portion on top of the block and gradually vibrated into the hex infill vertical cavities. Powder was added, dumped, filled, poured, and the like on top of the block and vibrated. At the end of this process, an excess of a powder layer was formed on top of the block bound by the tape. The tape was then removed, and the excess powder layer was removed using a doctor blade. The PF20-FF is a larger grain powder than the PF5-FF and the PF13-FF. The PF20-FF was used to find out if larger powder would result in better powder packing and therefore less distortion during sintering even if no separately printed cover is used. Both parts, i.e., the first block filled with PF13-FF covered with the roof 1310 and the second block filled with PF20-FF and no roof, were loaded on the same ceramic support plate before loading into the furnace, as shown in FIG. 13.

Figure 14A:
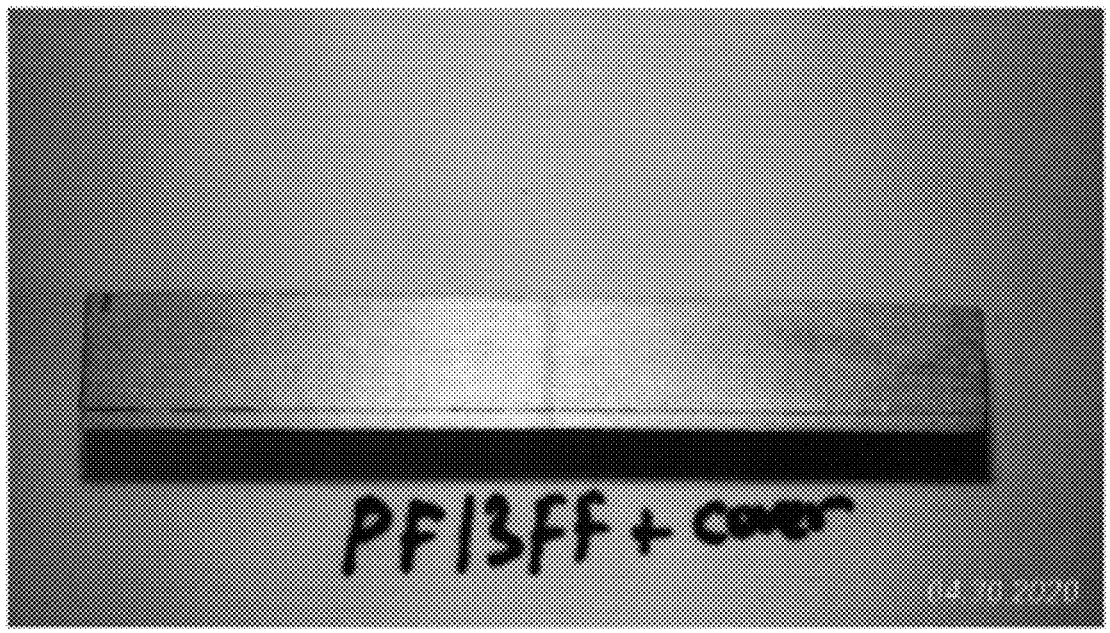
FIGS. 14A-14B are images of the two rectangular objects illustrated in FIG. 13 post-sintering.
Figure 14B:
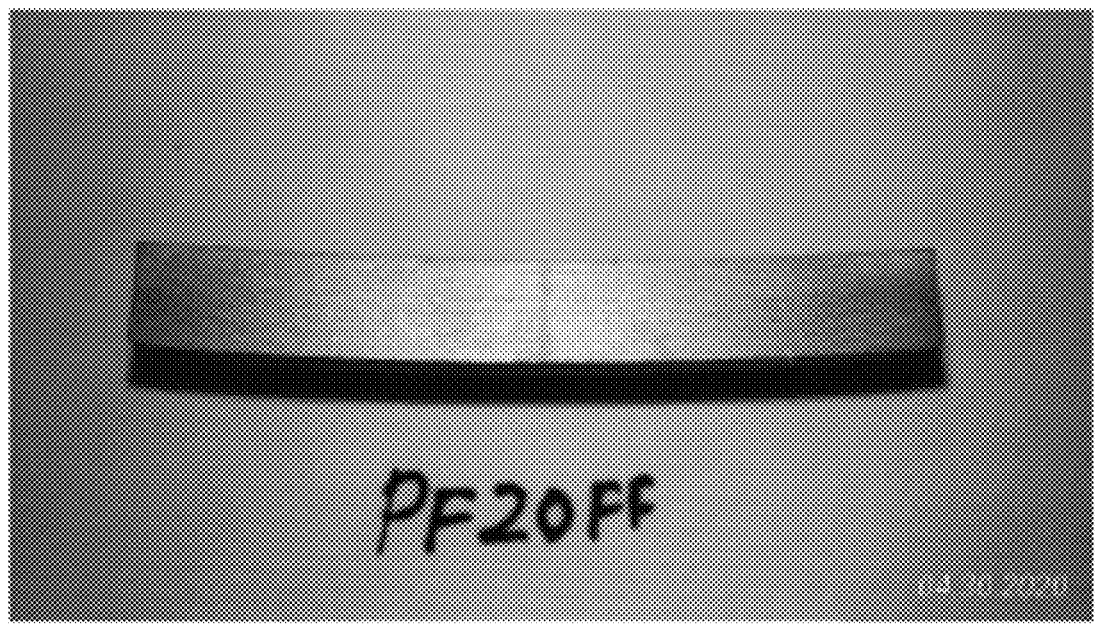

Both the first and second blocks were sintered in a MARKFORGED® Sinter 1 furnace using a modified regime for 17-4 SS modified for a higher peak temperature of 1225° C. FIGS. 14A-14B show a lengthwise side image of the post-sintered blocks. FIG. 14A shows an image of the PF13-FF dry metal powder filled rectangular block sintered with the roof. FIG. 14B shows an image of the PF20-FF dry metal powder filled rectangular block sintered without the roof.

The PF13-FF powder filled part (FIG. 14A) that was sintered with the roof attached remained straight, that is, it did not show evidence of the potato chip shape or curve post-sinter. The PF20-FF powder filled part (FIG. 14B) that was sintered without the roof came out distorted after sintering, that is, having the potato chip shape or a curve. Without wishing to be bound by any particular theory, it is believed that a powder filled part having an unbalanced outer shell, i.e., a non-symmetrical outer shell, distorts when sintered, while a powder filled part having a balanced outer shell, i.e., a symmetrical outer shell, retains its shape after sintering.

Archimedes density measurements showed that the PF13-FF sintered block density was 7.39 g/cm$^3$ and 94.74% of theoretical, 7.8 g/cm$^3$. The Archimedes density measurements showed that the PF20-FF sintered block density was 7.34 g/cm$^3$ and 94.10% of 7.80 g/cm$^3$. It is noted that the PF5-FF filled block density was measured at 7.50 g/cm$^3$ and 96.13% of 7.80 g/cm$^3$.

Example 3

The present Example describes a method of forming a powder filled die in accordance with another embodiment of the present disclosure.

Materials and Methods

The third example discloses powder filling rectangular blocks printed from 17-4 steel filament and filled with PF5-FF; PF13-FF; and PF20-FF powders and the microstructure printed, filled, and sintered blocks.

Metallographic samples were cut from three blocks. The three blocks were filled with PF5-FF, PF13-FF, and PF20-FF powders that were sintered at 1225° C. peak temperature as described in previous Examples #1 and #2. The samples were cut along a vertical plane close to a geometric center of each block. The samples were polished using colloidal silica final polishing media for 9 minutes each to provide a clear image of the part porosity.

Figures 15A, 15B, 15C, 15D, 15E, 15F, 15G, 15H, 15I:
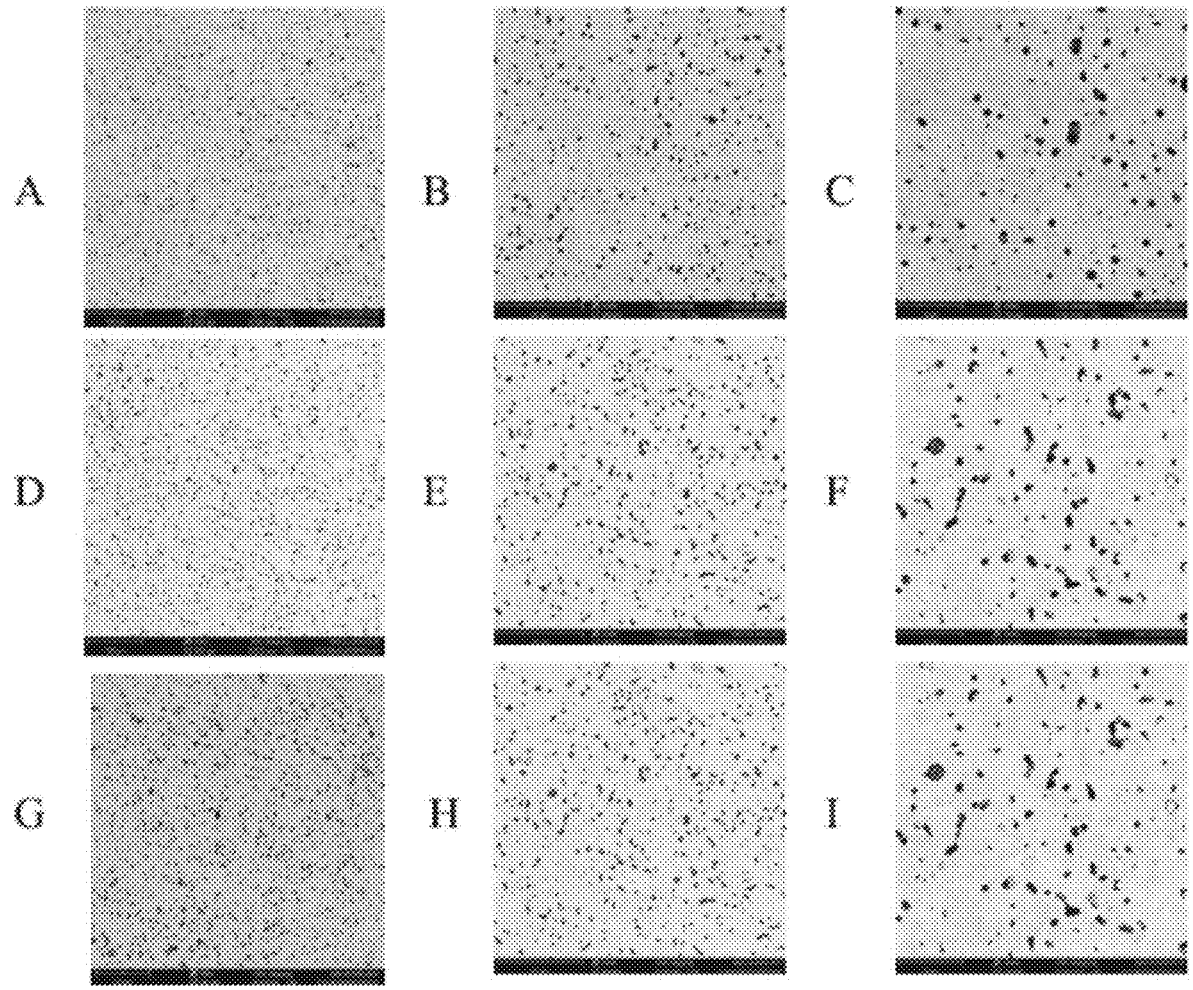
FIGS. 15A-15I are SEM images of PF5-FF, PF13-FF, and PF20-FF samples at magnification of 500×, 1000×, and 2000× showing their microstructure and porosity characteristics.

These samples were studied with scanning electron microscopy (SEM) using backscattered electrons contrast with specific focus on porosity general distribution and its quantitative characteristics, such as volume fraction, average size, and average aspect ratio of the pores. The results are shown in FIGS. 15A-15I. FIG. 15A shows the porosity of the PF5-FF at 500×. FIG. 15B shows the porosity of the PF5-FF at 1000×. FIG. 15C shows the porosity of the PF5-FF at 2000×. FIG. 15D shows the porosity of the PF13-FF at 500×. FIG. 15E shows the porosity of the PF13-FF at 1000×. FIG. 15F shows the porosity of the PF13-FF at 2000×. FIG. 15G shows the porosity of the PF20-FF at 500×. FIG. 15H shows the porosity of the PF20-FF at 1000×. FIG. 15I shows the porosity of the PF20-FF at 2000×.

Figure 16:
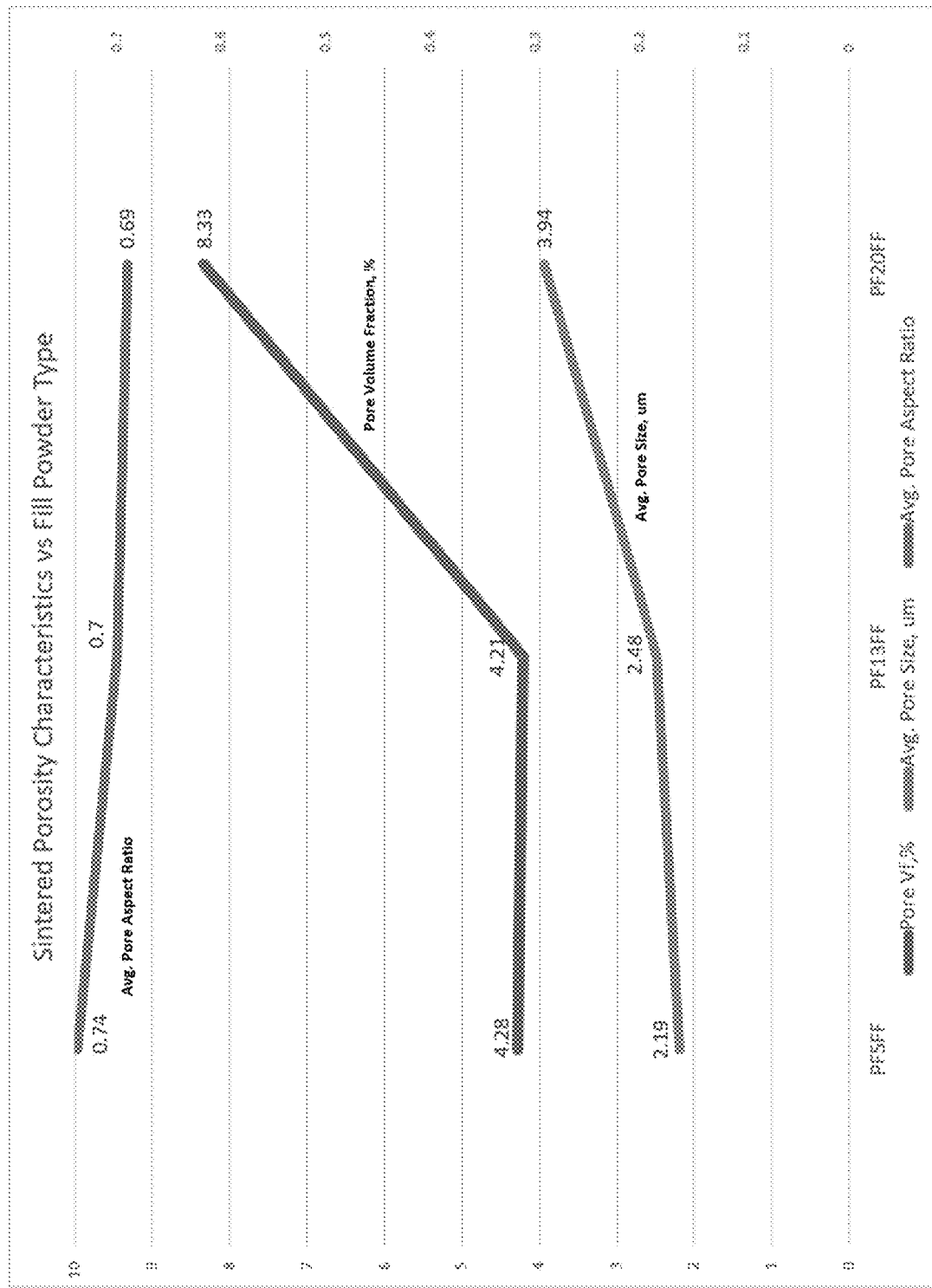
FIG. 16 is a graph showing sinter porosity characteristics v. fill powder type.

FIG. 16 shows a graph of the sintered porosity characteristics versus the powder type used for the fill. FIG. 16 compares the average pore aspect ratio for PF5-FF, PF13-FF, and PF20-FF. FIG. 16 compares the pore volume fraction, % for PF5-FF, PF13-FF, and PF20-FF. FIG. 16 also compares the average pore size, microns for PF5-FF, PF13-FF, and PF20-FF.

On a qualitative level, as the fill powder size increases, the average pore size increases and the volume fraction and inverse aspect ratio increases. This is especially evident when switching to PF20-FF powder when compared with the PF5-FF and PF13-FF.

This general qualitative trend was confirmed on a quantitative level using PhenomSEM pore analysis software ("PoroMetric") which was carried out using pictures taken for each fill powder size. The results are presented in FIG. 17.

A contradiction exists between the image analysis results and the density measurements provided in the previous experiments. In particular, PF20-FF filled sample density was measured to be close to PF13FF powder filled density, though image analysis shows that PF20-FF porosity is much higher, at least in the regions filled with the powder. Without wishing to be bound to a theory, a possible explanation might be that at 8% porosity level, the pores could communicate with each other so that during an Archimedes density measurement water got into the pores distorting the measurement towards higher values.

Another contradiction that exists is that that aspect ratio of the pores should be drastically lower for PF20-FF filled sample compared with PF13-FF and in particular PF-5FF. While the quantitative difference exists, it is not large. That contradiction could be explained by an observed tendency of the software to break long complex shaped particles into more compact blocks thus distorting the result. It looks like for elongated non-compact porosity ImageJ software would produce more reliable results.

In addition to qualitative and quantitative observations of pore population characteristics, observations concerning the porosity in the areas where powder filled regions interface with printed regions were made.

Figure 17:
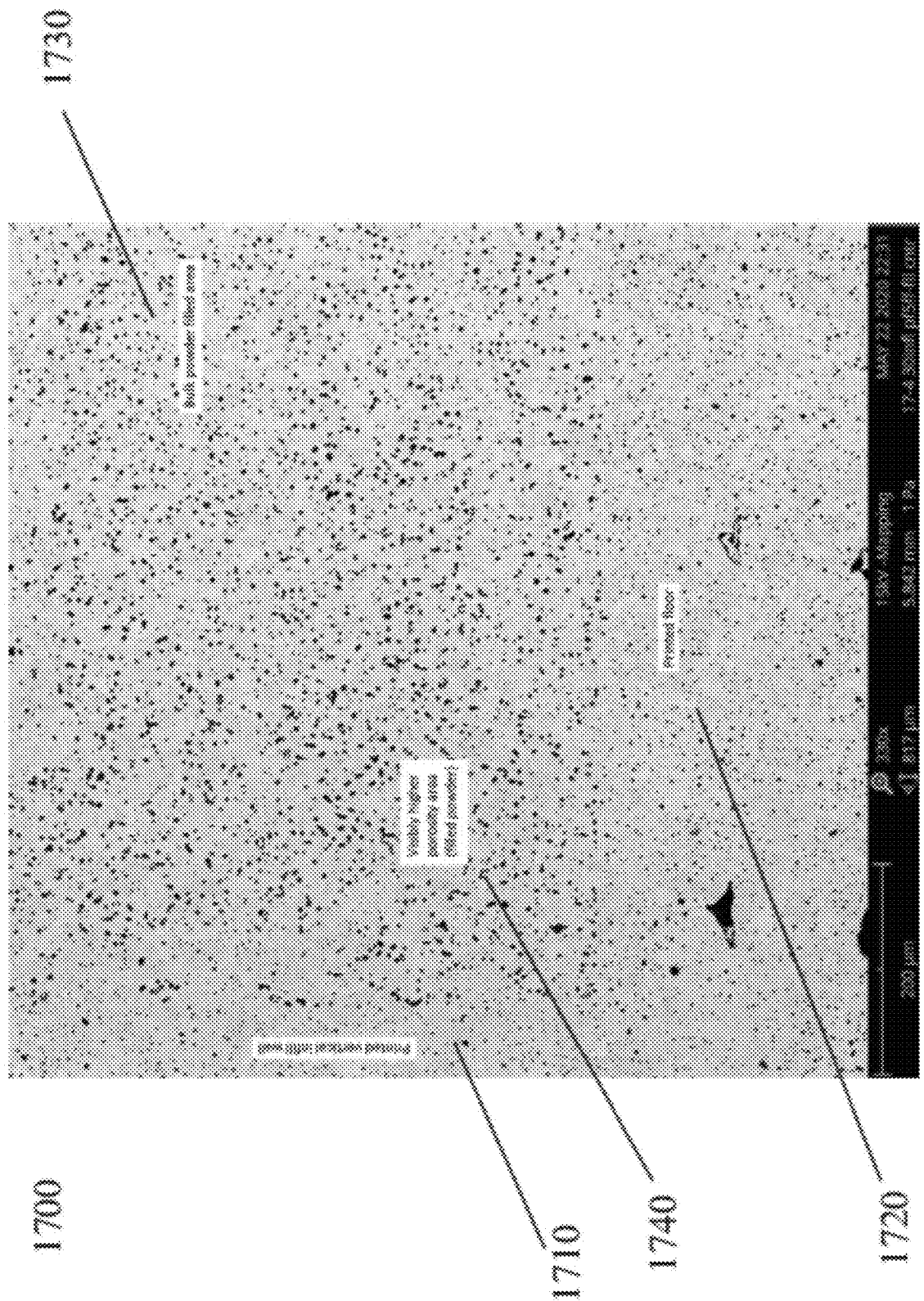
FIG. 17 shows an SEM image of PF5-FF, highlighting the porosity at an interface of the printed and powder-filled areas.

FIG. 17 details the observations for a PF5-FF filled sample, it was observed that an area where the regions interface powder filled/printed, porosity on the powder filled side is visibly higher than in the printed bulk. FIG. 17 at 1700 shows an interface, including a printed vertical infill wall, 1710; a bulk powder filled area 1730; and a printed vertical infill floor, 1720. The bulk powder filled area that is adjacent, 1740 to the printed vertical infill wall, 1710 and printed vertical infill floor, 1720 has a higher pore density.

Figure 18:
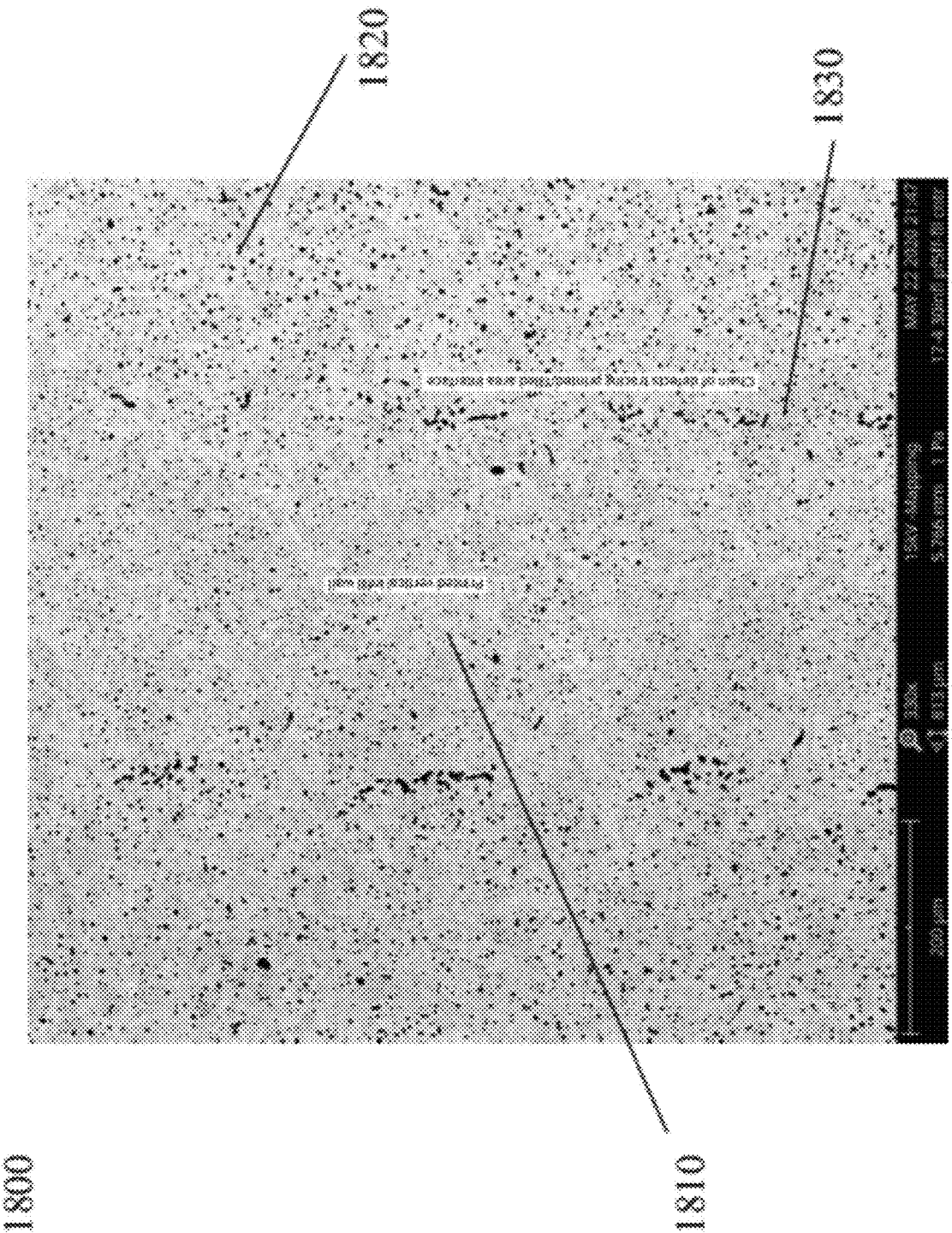
FIG. 18 shows an SEM image of PF5-FF, highlighting the porosity at an interface of the printed and powder-filled areas.

Moreover, a chain of long pore-like defects is usually present along a vertical interface between printed and powder filled regions. FIG. 18 at 1800 shows an interface, including a printed vertical infill wall, 1810 and a bulk powder filled area 1820. The bulk powder filled area at the interface shows a chain of pore-like defects tracing the printed/filled area interface, 1830.

Figures 19A, 19B:
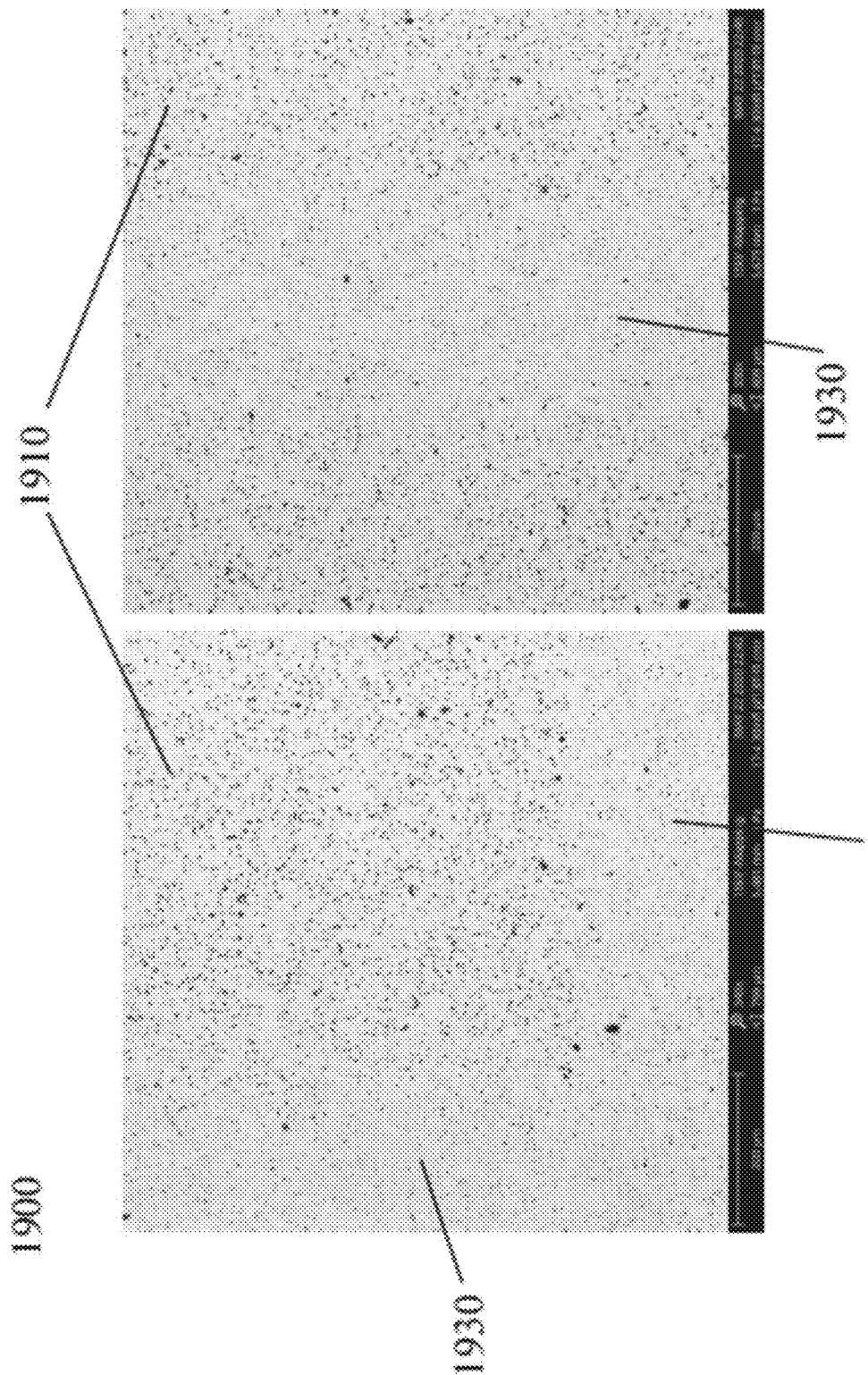
FIGS. 19A-19B show SEM images of PF13-FF porosity for two samples.

By contrast, when the powder-filled area is powder filled with a PF13-FF, higher porosity, i.e., higher defects, areas are not observed in the areas where printed regions meet filled powder areas. That is, the interface does not show a higher density or chains visible with PF5-FF powder fill. FIGS. 19A-19B illustrate images of a PF13-FF filled samples 1900 where it was observed that an area where the porosity at interfaces between powder filled areas 1910 and printed vertical infill walls 1820 and printed floors 1830 are substantially uniform with that of the bulk powder filled area.

Based on a very high porosity in the powder filled areas under SEM, PF20-FF is likely not a suitable powder for filling infill-printed parts.

Example 4

The present Example describes a method of forming a powder filled die in accordance with another embodiment of the present disclosure.

Materials and Methods

This example discloses powder filling a rectangular block printed from 17-4 steel filament and with PF5-FF and PF13-FF powders and the mechanical properties of the printed, filled, and sintered blocks.

A set of five dog bone shaped samples were printed without a floor and roof using a 30% hex infill setting. The dog bone shaped samples were washed and then glued to a ceramic plate using methacrylate glue. Tape was used to wrap the edges of each sample to contain the added PF5-FF powder during fill and vibration procedure used to fill the silos of the open fill hex structure. The samples were sintered at 1225° C. for 3 hours at peak temperature.

Figure 20A:
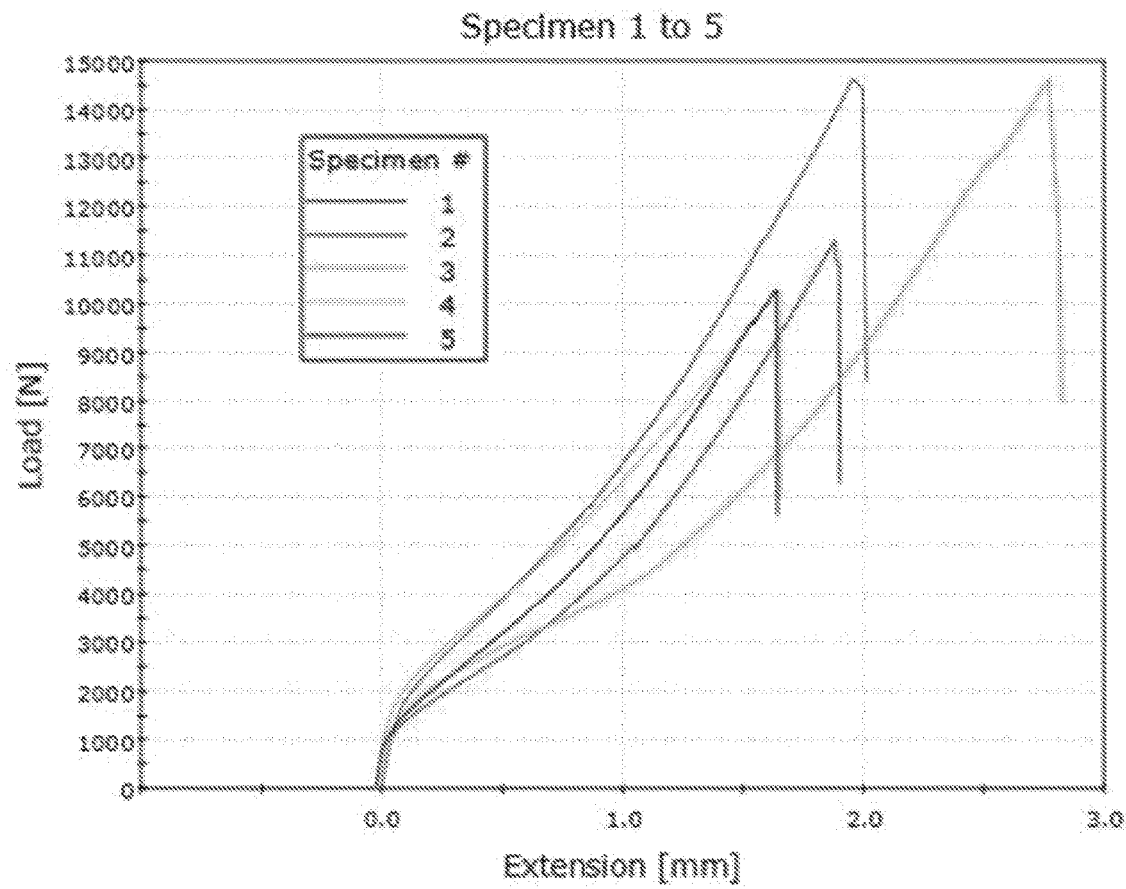
FIGS. 20A-20B shows mechanical break data and images of broken objects.
Figure 20B:
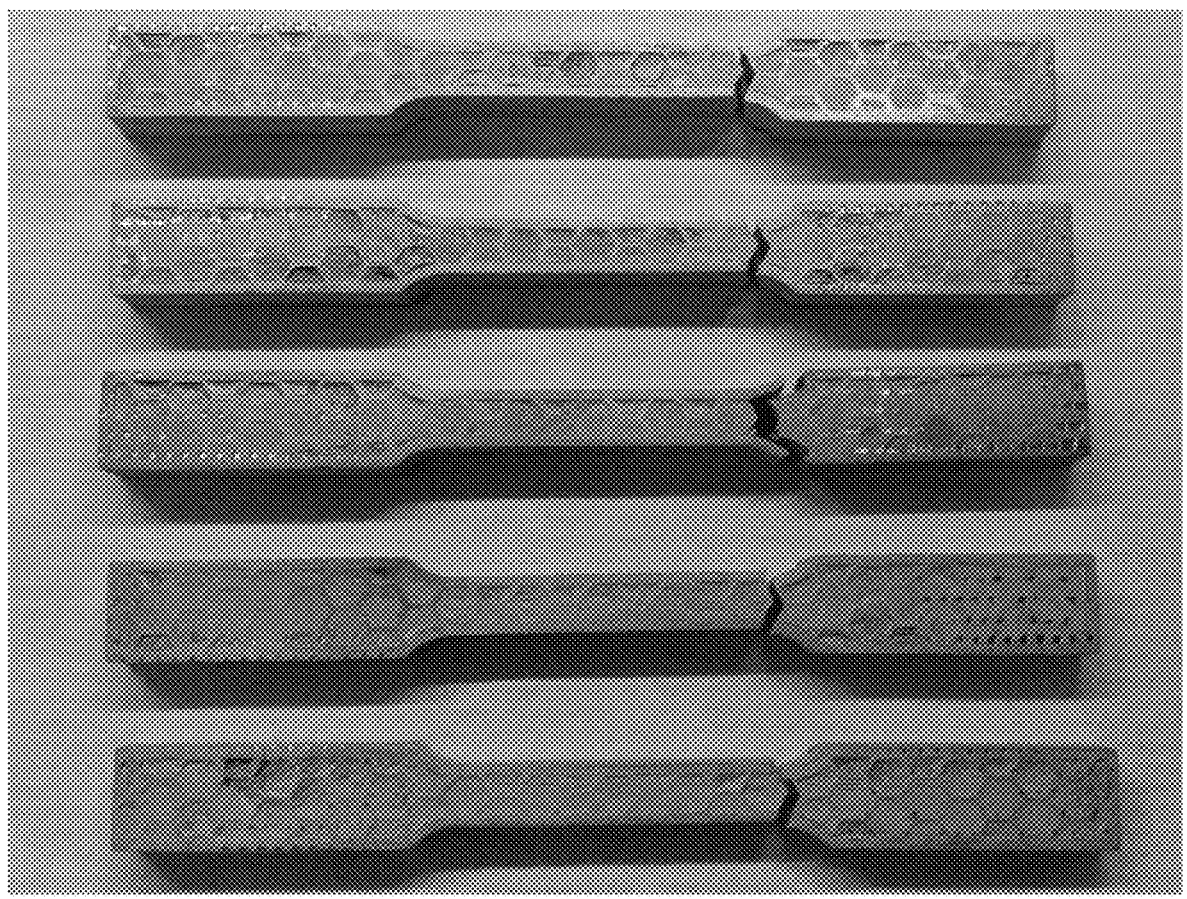

FIG. 20A shows the mechanical test results. All five samples broke at stress levels between 277 and 390 MPa. The typical level at which a 17-4 steel additively manufactured sample is expected to break is at least about 1000 MPa. These samples were also very brittle with elongation not reaching 0.3%. FIG. 20B shows images of the sample having fractured under stress. The fracture in each sample occurred along the printed area/powder-filled area interface and in the tab to gauge transition region, i.e., from then end of the sample to the center of the sample. Based on the observed microstructure showing chains of defects along the interface of the vertical printed infill walls with PF5-FF free flowing powder filled areas, such fracture modes are not unexpected.

Elemental boron powder (1-2 micron particle size) at 0.3% wt. was added to the PF5-FF powder fill in a dry state in a stainless steel beaker. 10% wt. ethanol was added to the mixture to form a slurry that was vigorously stirred by a mechanical stirrer rotating at about 1500 rpm for several minutes. The alcohol was removed from the slurry in a 70° C. forced air convection furnace. The dried powder mixture was then stirred mechanically to break up any weak agglomerates formed during drying and to restore powder flowability.

Six dog bone shaped samples were printed using 17-4 steel filament. A hex infill at a 30% setting was employed. The walls were set at 0.5 mm thickness. Three of the samples were printed without a floor and the other three samples were printed with a 0.25 mm thick floor. While not wishing to be bound to a theory, an expectation for the samples including a floor was that a thin floor will not result in warping, i.e., curving or distortion, of the samples during sintering that is usually observed for free-flowing powder filled unbalanced shapes that have standard thickness floors but no roofs. At the same time, dog bones shaped samples that have a floor are easier and more reliably glued to an alumina ceramic substrate used during the vibration filling procedure as a support for the dog bone shaped samples. The samples were sintered at a peak temperature of 1250° C.

Figure 21A:
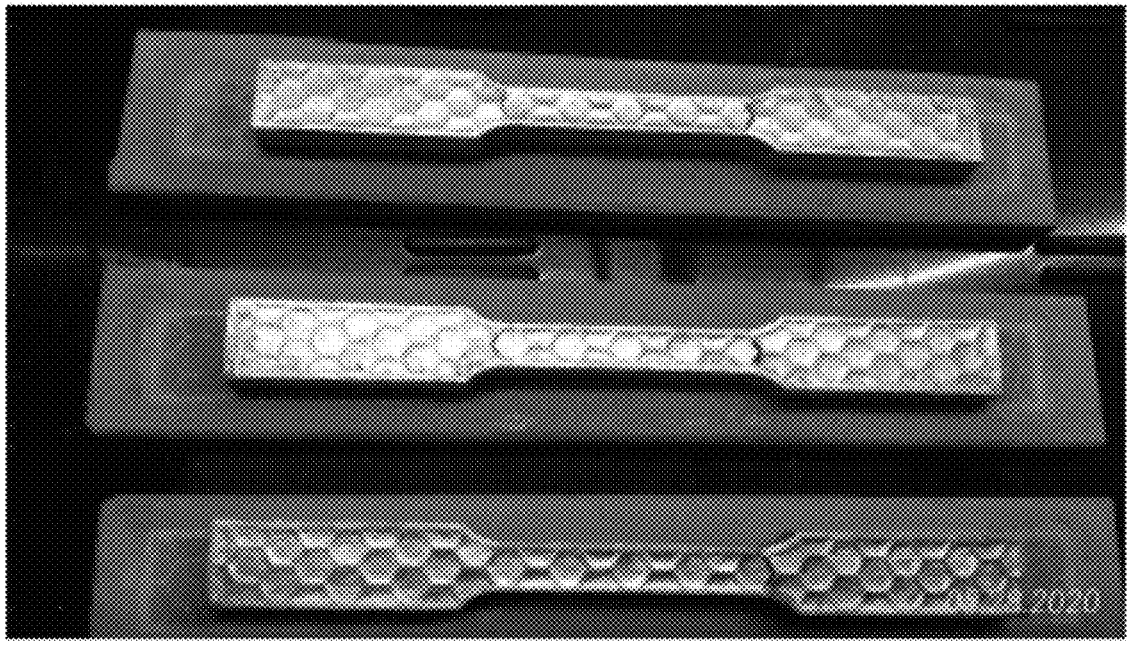
FIGS. 21A-21B show images of post-sintered samples.
Figure 21B:

FIGS. 21A-21B show images of the dog bone shaped samples having fractured under stress. FIG. 21A shows dog bone shaped samples without a floor. FIG. 21B shows dog bone shaped samples with a thin printed floor. The fracture in each occurred along the printed area/powder-filled areas interface and in the tab to gauge transition region. Based on the observed microstructure showing chains of defects along vertical printed infill walls interface with PF5-FF free flowing powder filled areas, such fracture modes are not unexpected.

Figure 22:
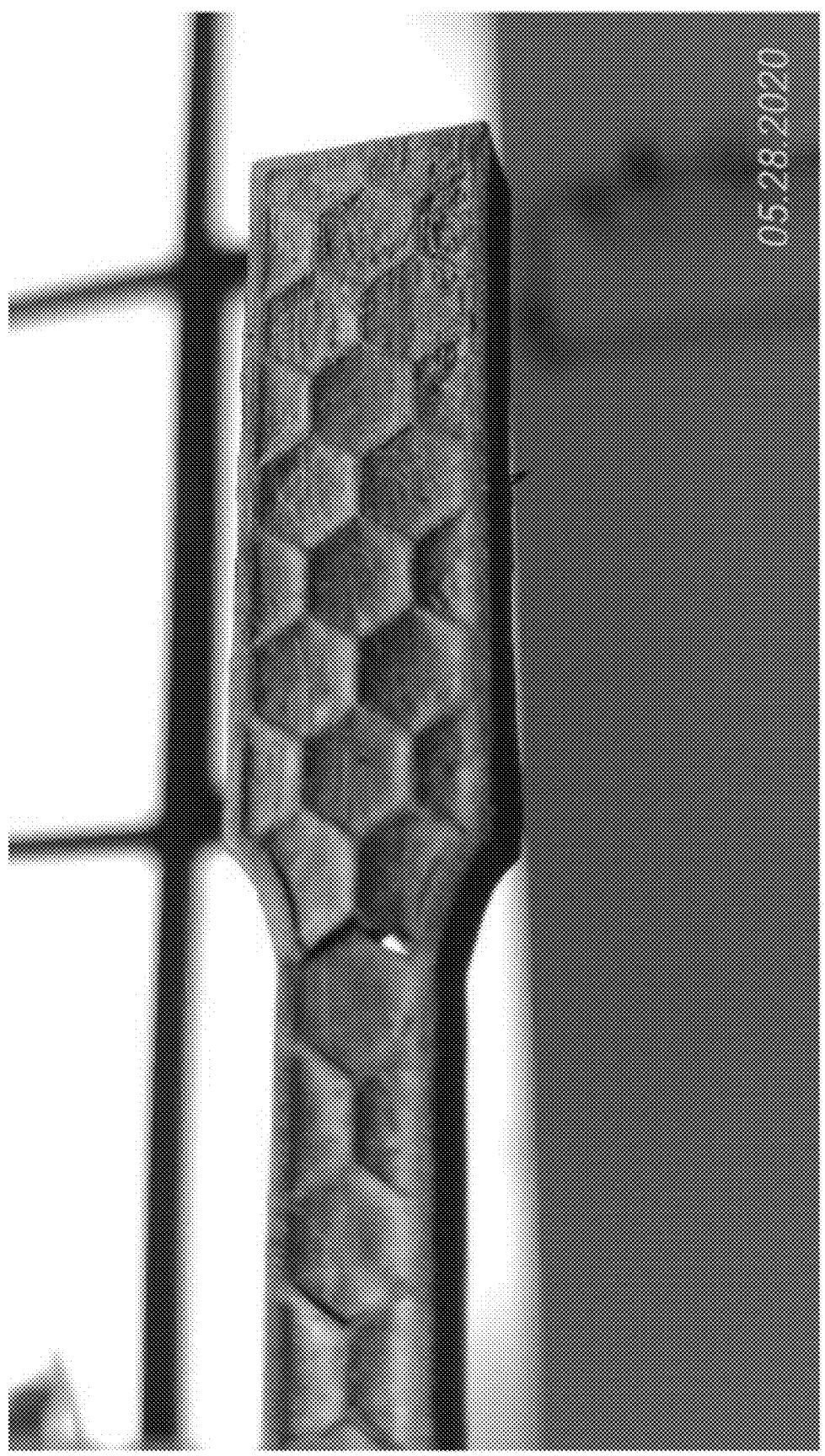
FIG. 22 shows an image of a post-sintered sample for PF5-FF filled material having liquid phase boron added to the free-flowing powder.

As illustrated in FIGS. 21A and 21B, both samples, i.e., with and without the floor, came out straight and not distorted. The liquid phase sintering did not achieve the stated objective. It appears that vibration-filled powder sintered and may have pulled away from printed infill cell walls leaving a physical gap between them. A physical gap can be clearly seen on a picture of a floor-less sample as shown in FIG. 22. Each of these samples were tested and mechanical testing showed close to zero strength.

PF13-FF samples were prepared and tested. Six dog bone shaped samples with 0.25 mm thick floors, 0.5 mm thick walls, having no ceilings, and 20% hex infill pattern were printed and washed.

As above described, two techniques were used to fill the samples, including a regular dry vibration filling and a slurry filling. The slurry of PF13-FF powder was prepared by mixing the powder with 10% wt. of ethanol using a high speed (1500 rpm) mechanical mixer in a 50 mL stainless steel beaker. Immediately after mixing, the slurry was poured over a tape-wrapped dog bone shaped sample and mechanically vibrated using a vibration table for about 3 minutes. The filled samples were dried in a forced convection furnace at 70° C. for an hour. The tape was removed from the samples and excess powder removed from top using a doctor blade. Dry-filled and slurry-filled vibrated samples were sintered at 1250° C. peak temperature in a MARKFORGED® Sinter-1 furnace.

Figure 23A:
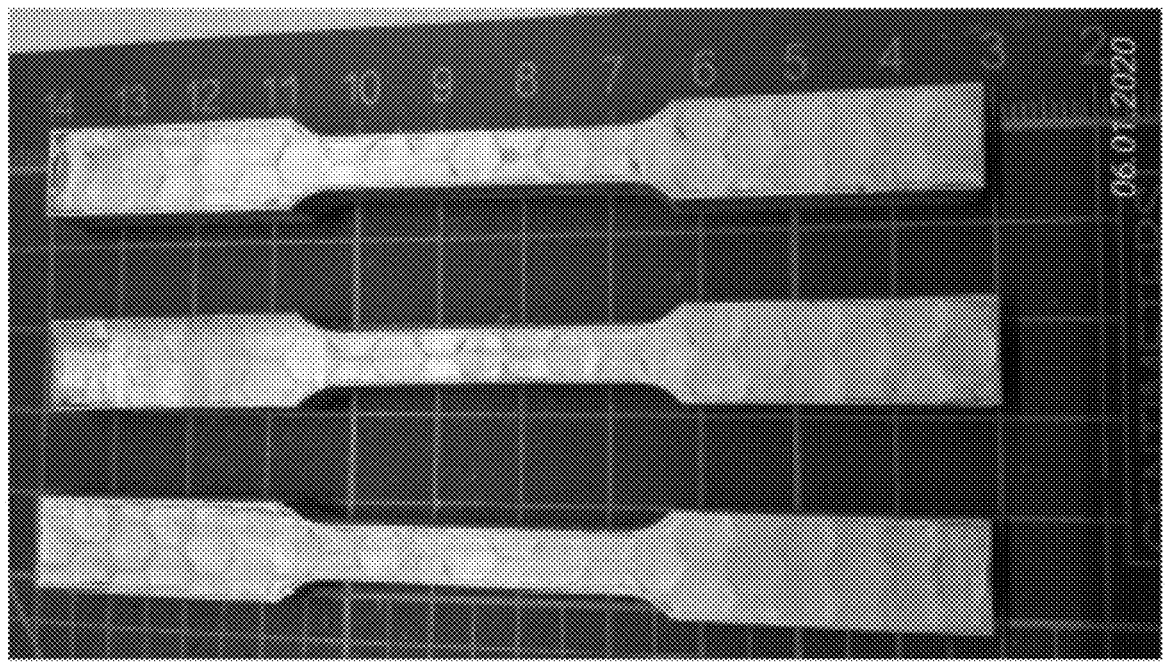
FIGS. 23A-23B show images of PF13-FF sintered slurry-filled samples.
Figure 23B:
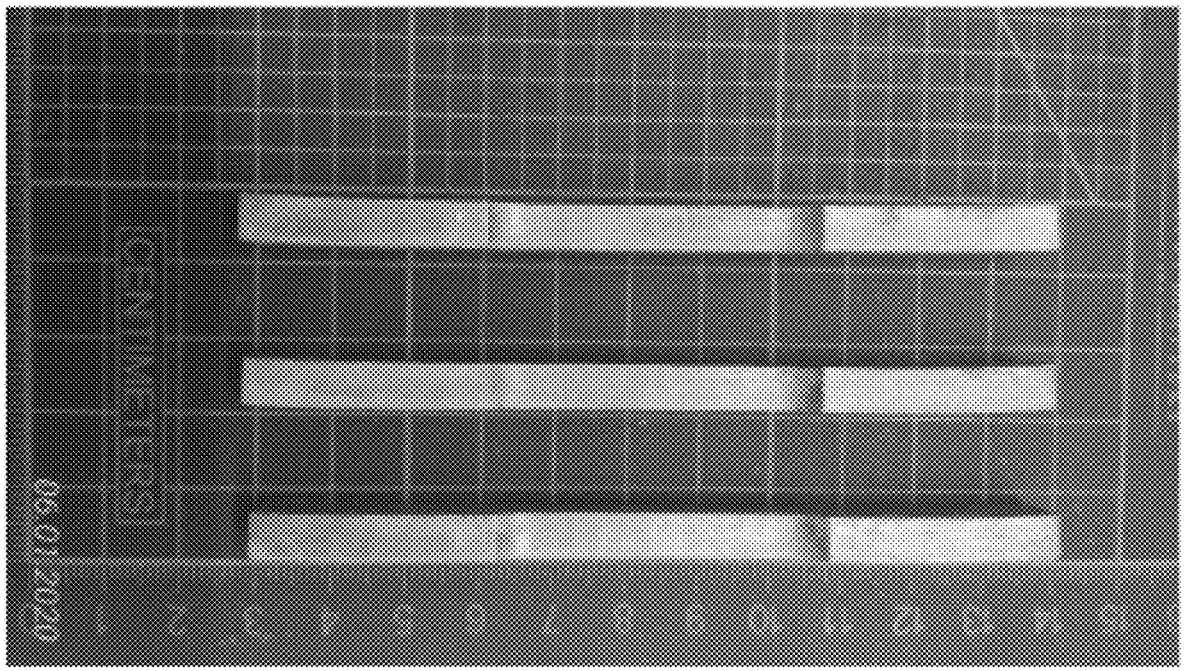

FIGS. 23A-23B show the sintered slurry-filled samples. FIG. 23A shows the top side. FIG. 23B shows the lengthwise side. A slight visible curved, i.e., potato chip, distortion close to the samples' tab ends is observed if viewed at the samples on-edge. The top surface of the samples showed signs of visible shrinkage between printed and powder filled areas as a sticking out of infill walls, i.e., vertical steps, and possibly cracks in these areas.

Figure 24A:
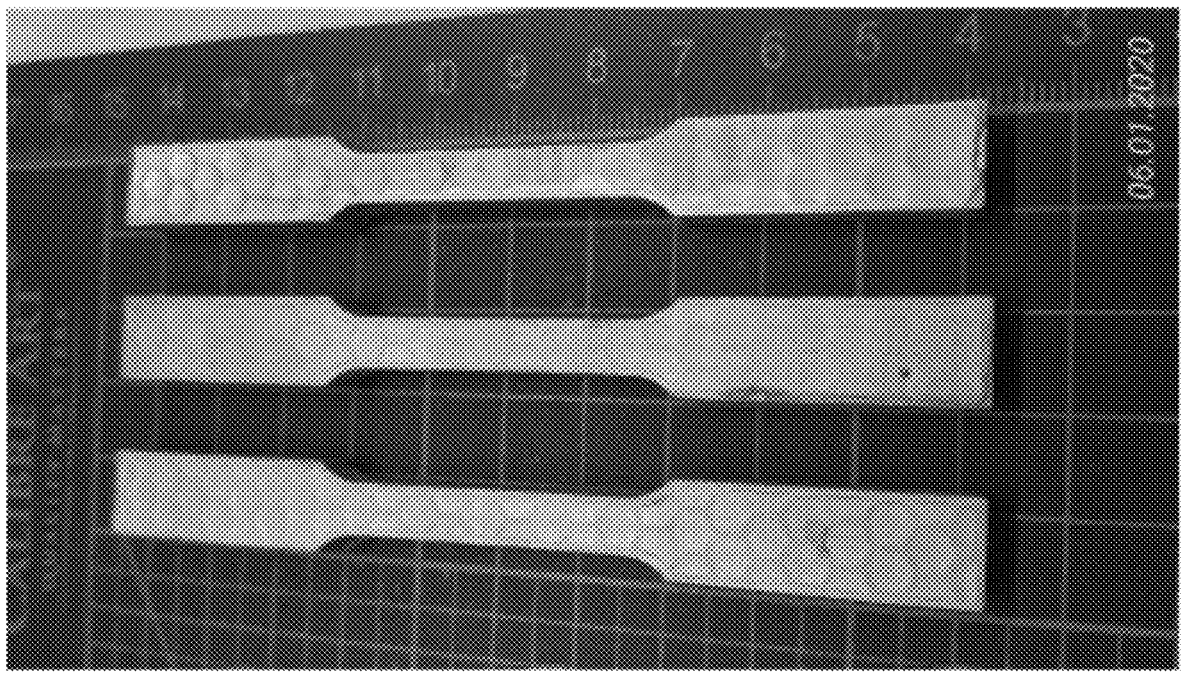
FIGS. 24A-24B show images of PF13-FF sintered dry powder-filled samples.
Figure 24B:
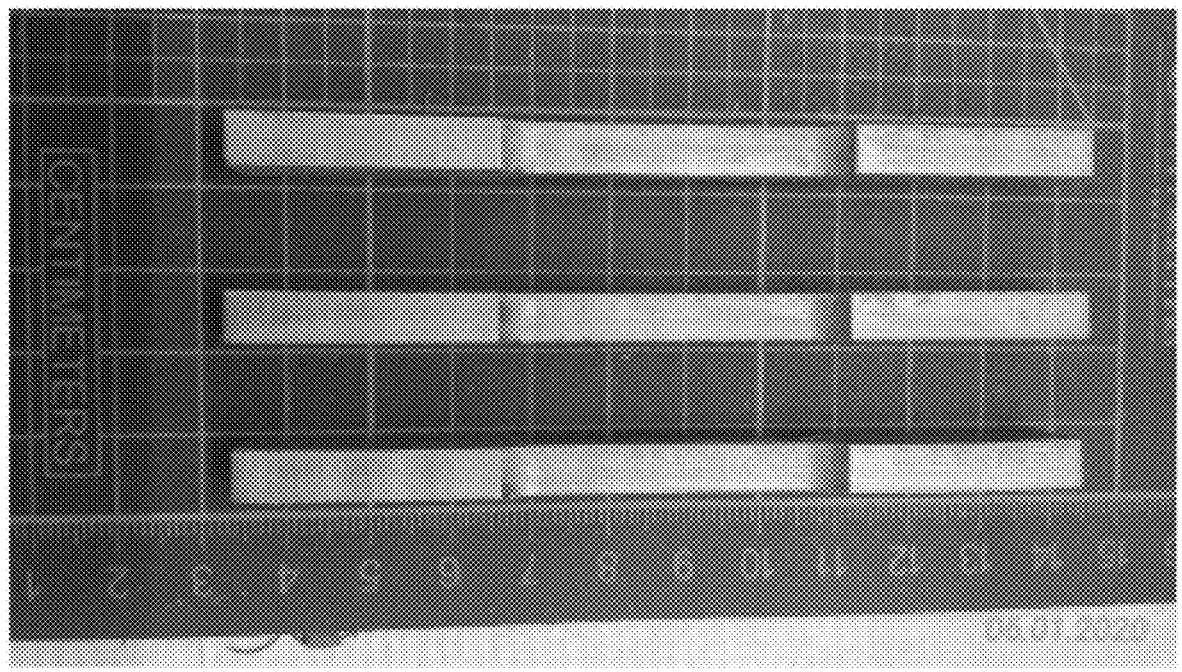

FIGS. 24A-24B show the sintered dry powder samples. FIG. 24A shows the top side. FIG. 24B shows the lengthwise side. The top surfaces of the dry metal powder vibration-filled samples have a smoother appearance when compared to the slurry filled samples. The dry metal powder filled samples show no visible crack-like features. An on-edge view of the dry metal powder filled samples show that they are essentially straight. In addition to these observations, mechanical test results for slurry-filled samples and dry powder vibration-filled samples are presented in below Table 2.

TABLE 2

Mechanical Testing on dry powder filled and slurry filled samples

| Sample Number | Powder Fill Technique | UTS, MPa | Strain at Failure, % |
|---|---|---|---|
| 1 | slurry vibration-fill | 463 | 0.43 |
| 2 | slurry vibration-fill | 398 | 0.42 |
| 3 | slurry vibration-fill | 317 | 0.27 |
| 4 | dry powder vibration-fill | 645 | 0.38 |
| 5 | dry powder vibration-fill | 674 | 0.47 |
| 6 | dry powder vibration-fill | 679 | 0.23 |

Data in Table 2 shows that slurry-filled samples exhibit much lower strength than dry powder-filled ones. However, both types of filling techniques result in low elongation samples.

Figure 25A:
FIGS. 25A-25B show images of PF13-FF samples having undergone mechanical break testing.
Figure 25B:
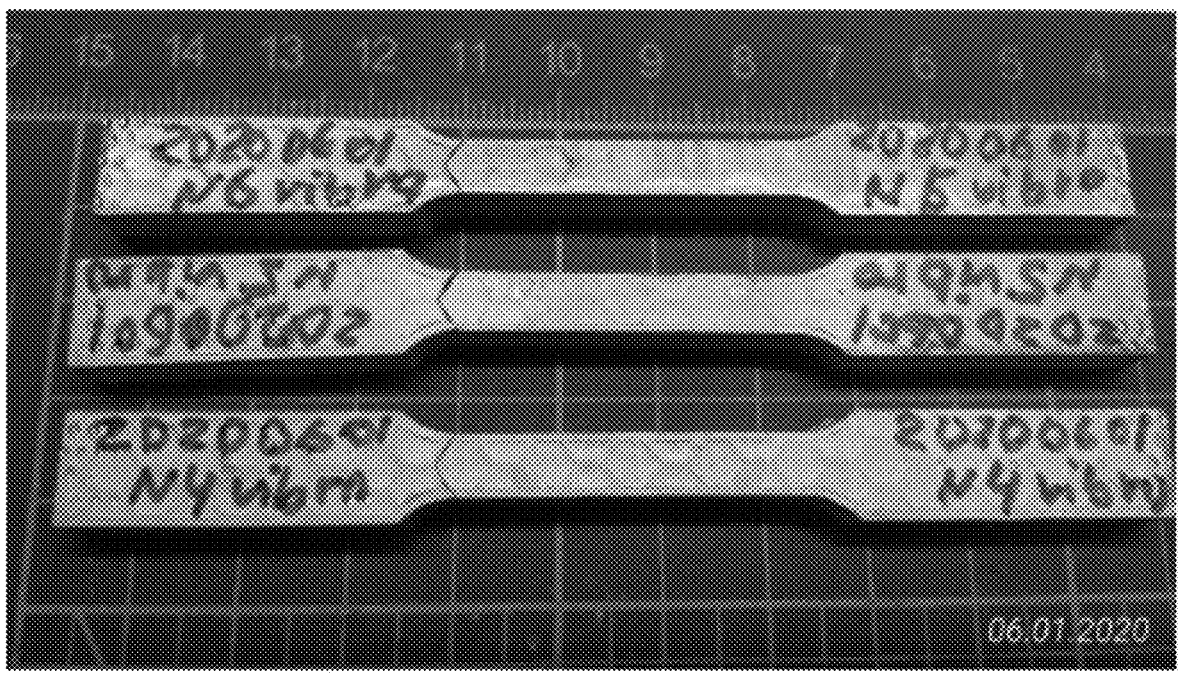

FIGS. 25A-25B show images of the PF13-FF samples having fractured under stress. FIG. 25A shows the slurry vibration fill samples 1-3. FIG. 25B shows the slurry vibration fill samples 4-6. The fracture surface pattern in both sets of samples follow boundaries between slurry filled areas and printed infill walls. The slurry-filled samples broke in a gauge area. The dry powder-filled samples broke in the gauge-to-tab transition portion of the samples.

Results

PF5-FF powder is likely not as good of a candidate for vibration filling as PF13-FF when used for filling of a hexagonal infill (30% setting) dog bone shaped sample. The resultant sintered strength for these PF5-FF samples was low, between 277 and 390 MPa.

The addition of boron to a fill powder may not be a benefit or may lead to a negative effect. PF5-FF powder with 0.3% wt. boron powder addition used for filling of a hexagonal infill (30% setting) dog bone shaped sample led to a pronounced consolidation of the fill powder during sintering. However, the consolidated powder shrunk away from infill walls leaving gaps that were continuous and visible through the sample thickness by a naked eye.

The use of PF13-FF powder showed improved mechanical properties when used for vibration filling of a hex infill (30% setting). Sintered dog bone shaped samples exhibited a tensile strength that measured between 649 MPa and 677 MPa. An alcohol-based slurry of PF13-FF powder for vibration-filling resulted in a lower mechanical strength of between about 317 MPa to about 463 MPa.

Printing of a thin 0.25 mm floor, filling a sample and sintering it without a top cover to balance out the structure did not lead to any visible sample shape distortion after sintering.

Example 5

The present Example describes a method of forming a powder filled die in accordance with another embodiment of the present disclosure.

Materials and Methods

This example describes the effect of infill geometry and cell size on their mechanical properties of 17-4 steel filament printed dog bone shaped samples vibration-filled with PF13-FF powder.

The infill geometries and cell sizes controlled by density settings were as follows:
1. transverse-large (10% dense); to produce the geometry the fill pattern may be set to rectangular, while the fill angles may be set to 90° and the fill density may be set to 10%.
2. transverse-small (20% dense); to produce the geometry the fill pattern may be set to rectangular, while the fill angles may be set to 90° and the fill density may be set to 20%.
3. rectangular-large (10% dense); to produce the geometry the fill pattern may be set to rectangular, while fill angles may be set to the sequence 90°, 90°, 90°, 0°, 0°, 0° (these angle settings may result in parallel 3-filaments high vertical infill wall layers that are consecutively stacked at 90 degrees to each other) and fill density may be has to be set to 10%.
4. rectangular-small (20% dense); to produce the geometry the fill pattern may be set to rectangular, while fill angles may be set to the sequence 90°, 90°, 90°, 0°, 0°, 0° (these angle settings may result in parallel 3-filaments high vertical infill wall layers that are consecutively stacked at 90 degrees to each other) and fill density may be has to be set to 20%.
5. triangular-large (20% dense); to produce the geometry the fill pattern may be set to triangular, while the fill density may be set to 20%.
6. triangular-small (31% dense); to produce the geometry the fill pattern may be set to triangular, while the fill density may be set to 31%.
7. empty shell: to produce this geometry the fill pattern may be set to rectangular and the fill density to 0%.

For all geometries/cell sizes, the floor thickness may be set to 0.25 mm and the wall thickness to 0.5 mm. To expose the infill, a dog bone shaped sample print may be stopped one layer before the first roof layer starts to print.

Figure 26:
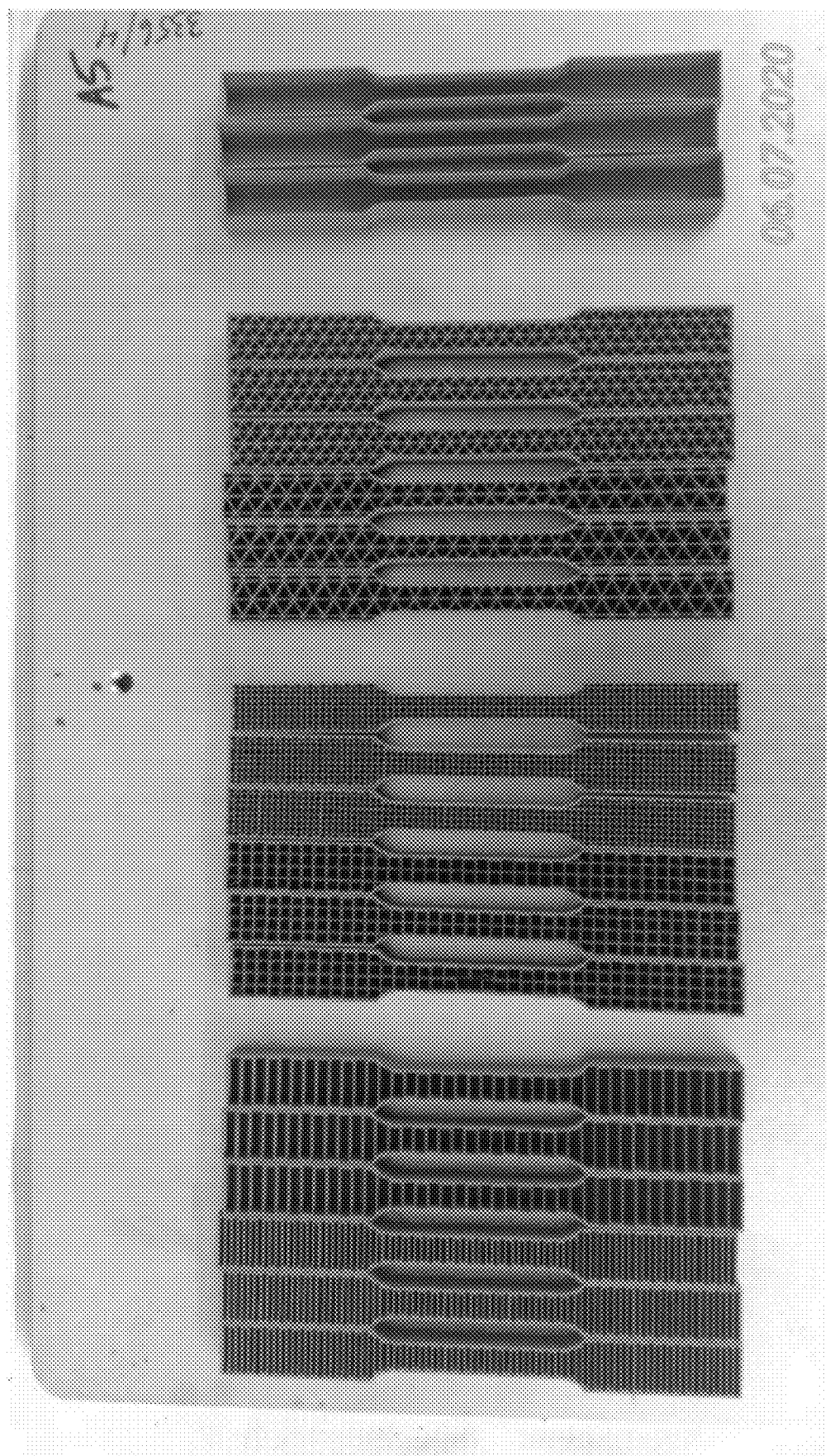
FIG. 26 shows images of dog bone-shaped samples that were printed for the various cell infill geometries and various cell sizes.

FIG. 26 shows samples were printed for each geometry/cell size.

The printed samples were washed, vibration-filled with PF13-FF powder and sintered using standard 17-4 temperature and gas profile, except for peak temperature that was set to 1250° C. The samples sintered and no cracks or distortions were visually apparent.

The empty shell samples did not sinter. The empty printed shells delaminated from the fill powder during sintering and the fill powder sintered with cracks and into visibly deformed shapes. Tensile strength measurements showed the empty cell samples fractured at 828 and 802 MPa stress and 1.19 and 1.36% elongation.

Figure 27:
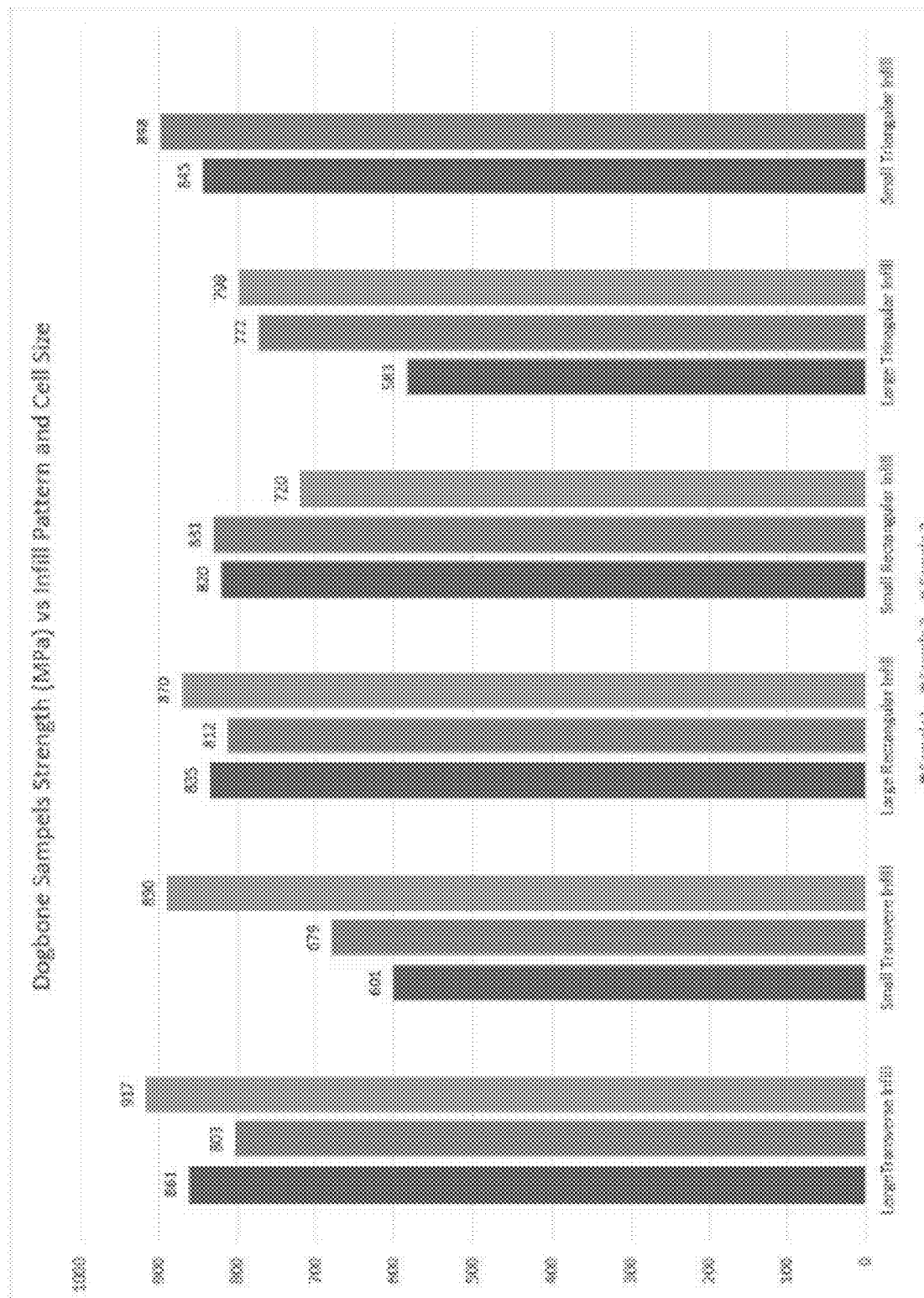
FIG. 27 graphs the results of testing sintered samples for various cell infill geometries and various cell sizes.

FIG. 27 graphs the results of testing of all the sintered samples for all of the various cell infill geometries and cell sizes.

Figure 28:
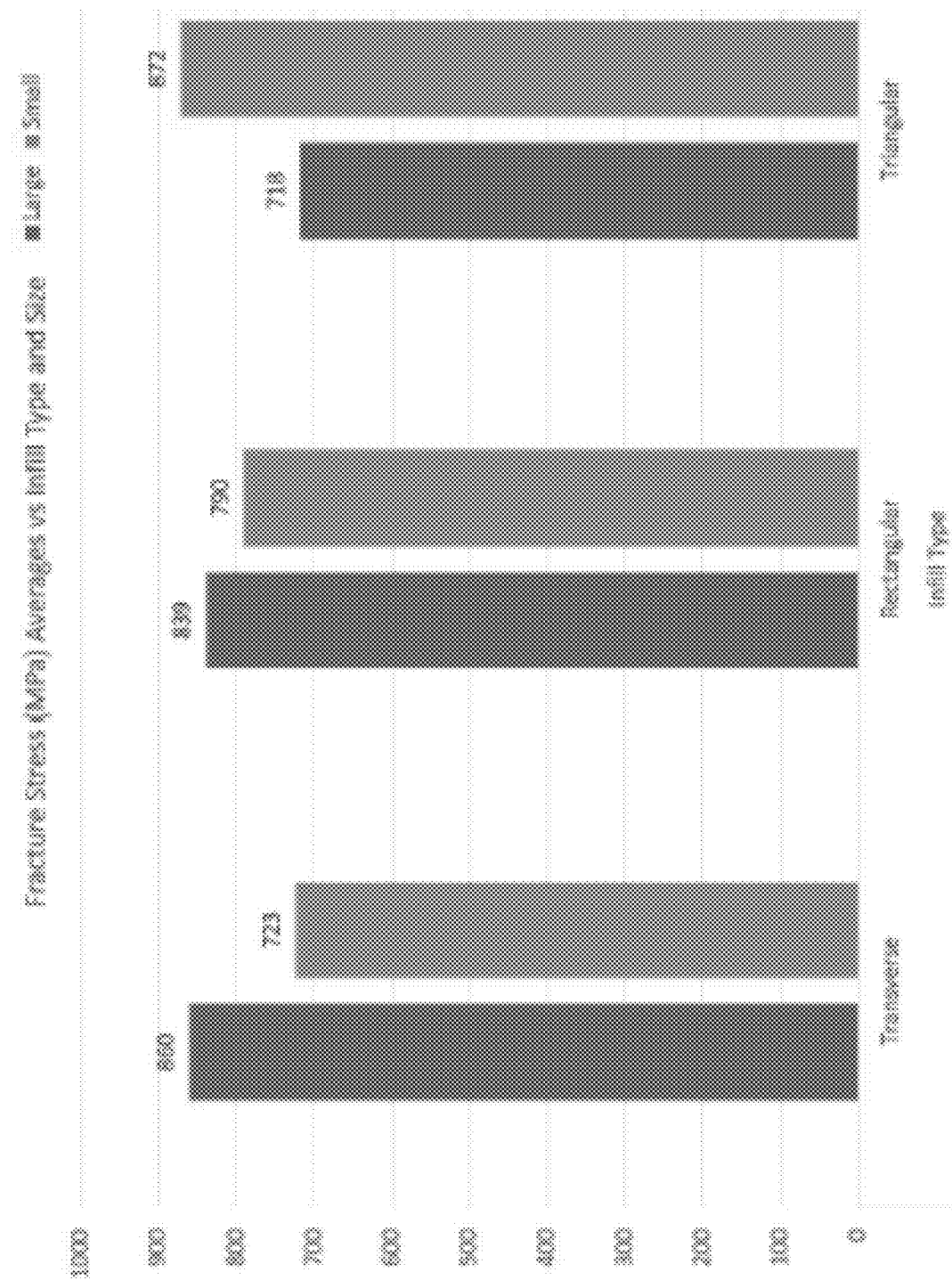
FIG. 28 graphs the average strength for the transverse, rectangular and triangular infill groups for large and small cell sizes.

FIG. 28 graphs the average strength for the transverse, rectangular and triangular infill groups for large and small cell sizes.

As the graphs in FIGS. 27 and 28 show, independent of the infill geometry or infill cell size, tensile strength for the tested samples is considerably higher than for the 30% hexagonal infill geometry vibration-filled with PF13-FF powder samples, having the 666 MPa average strength for the hex infill samples. Each of the other geometries shows higher strength, including the transverse infill samples exhibiting a 723 MPa lowest average and an 860 MPa highest average reported strength, the rectangular infill samples exhibiting a 790 MPa lowest average and 839 MPa highest average reported strength, and the triangular infill samples exhibiting a 718 MPa lowest average and 872 MPs highest average reported strength.

This result may be unexpected, at least for a transverse infill as the transverse infill geometry interfaces between printed infill walls and vibration-filled powder volumes have the most severe normal tensile stress conditions. Yet, it has demonstrated a high strength result, 860 MPa average, for large transverse infill geometries.

With regard to a trend, where larger infill cell size results in a higher strength was confirmed at least for transverse and rectangular geometries. For example, 860 MPa v. 723 MPa for large v. small transverse infill, and 839 MPa v. 790 MPa for large rectangular v. small rectangular infill cell size. The trend is reversed for triangular infill, in which small infill cell size has shown higher strength than the large one. While not wishing to be bound to any particular theory, there may be a detrimental interplay between the infill and dog bone shaped sample geometries, that is, since triangular infill pattern is similar to a hex infill, e.g., a hexagon infill consisting of six triangles, resulting in increased stress. The highest overall strength was exhibited by the small triangular infill samples.

Example 6

The present Example describes a method of forming a powder filled die in accordance with another embodiment of the present disclosure.

Materials and Methods

This example describes the mechanical properties of printed infill only, solid printed infill, and printed infill vibration-filled with dry powder samples tested in flexure.

Tensile strength is an important characteristic of any material, however, to understand whether one material can be substituted for another, materials should be tested under stress conditions that approximate real service conditions. For example, a metal part used under tensile load conditions cannot be replaced by a ceramic since generally ceramic materials have poor tensile properties, however if the part is working under compressive stress such substitution could be successful.

Steel parts and dies in particular often find themselves under a compressive, flexural or a mixed compressive and flexural mode of loading. Flexural loading of a steel sample printed using an infill pattern that is then vibration-filled with steel powder in particular could produce results that are different from those obtained under tensile loading. One possible reason for the difference is that a printed and filled sample must have a printed floor, and under flexural load applied to the test sample that floor will experience the highest (over sample cross-section) tensile stress, which initiates sample fracture. Therefore, a printed layer could be expected to make a considerable contribution to an overall mechanical strength of a sample tested in flexure. A similar argument can be made for a printed and vibration-filled part or die. A printed layer could play a considerable role in how it resists fracture under a flexural load.

Test and sample geometry were chosen based on the following considerations. There is no ASTM standard dealing with flexure testing of metallic samples. A test geometry was chosen based on ASTM D790 for flexure testing of high modulus (plastic matrix) composite materials.

First, a test sample was chosen based on cross-sectional shape and size. The cross-sectional shape was chosen to be a square for simplicity. The sample thickness was chosen such that its transverse vertical cross-section would contain about 10% of a printed floor area. Therefore, if printed floor would be fixed at 1 mm thick, overall sample thickness would be 10 mm.

MARKFORGED® Metal X printers allow for a floor thickness of 2 mm maximum to be printed, therefore setting sample thickness at 10 mm and floor thickness at 1 mm would scale to a part 20 mm thick with 2 mm floor, which is a reasonable representation of a real-life die insert geometry.

The standard requires that a flexure span must be a factor of 16 of the sample thickness, so the test span was set at 160 mm. The standard also specifies that sample ends that extend over the test span have to be at least 20 mm on each side bringing the overall sample length to 200 mm. It should be also noted that vertical wall thickness for a printed sample was set at 0.5 mm as a compromise between the desire to maximize brown strength of a part so it can be handled safely and the desire to minimize printed vertical wall impact on strength measurements. Crosshead speed for the test was set at ⅒th of a speed used by MARKFORGED® for plastics testing since it was expected that metal samples would exhibit much lower deflection before breaking and therefore enough data points needed to be collected to obtain good estimate of an elastic modulus of a tested material.

Three types of samples, i.e., three samples per each type, were printed, processed and sintered. Specifically, these samples included solid infill, vibration-filled triangular infill samples, and triangular infill-only.

Solid infill samples were printed using regular 17-4 steel filament and solid infill setting, washed and sintered at 1250° C. peak temperature. All other temperature/atmosphere profile parameters were kept the same as for standard 17-4 steel Sinter I schedule.

Vibration-filled triangular infill samples were printed using regular 17-4 steel filament and 31% triangular infill setting. They were printed without a roof that was printed separately. The samples were vibration-filled with PF13-FF dry powder and then the roof was attached to the filled and doctor-bladed sample using Loctite 401 (MMA) glue at the seams. The samples were sintered using the same 1250° C. peak temperature schedule (and the same furnace run) as solid infill samples above.

Triangular infill only samples were used as a baseline representing default print technology. They were printed using regular 17-4 steel filament and 31% triangular infill settings. The floor and roof thickness were set at 1 mm thick and vertical walls set at 0.5 mm thick. The samples were sintered using standard 17-4 schedule for the MARKFORGED® Sinter-1 furnace having a 1155° C. peak temperature.

Flexure tests results obtained from an Instron are presented in below Table 3.

TABLE 3

Flexure results for different infill pattern samples

| | Modulus-Young's (MPa) | Flexure extension at maximum flexure stress (mm) | Maximum flexure stress (MPa) | Strain at maximum flexure stress (mm/mm) | Flexure strain at yield (mm/mm) | Flexure stress at yield (MPa) |
|---|---|---|---|---|---|---|
| Solid infill 1 | 157015.20 | 10.30 | 1730.67 | 0.1566 | 0.0093 | 1135.14 |
| Solid infill 2 | 157771.07 | 11.10 | 1769.80 | 0.1689 | 0.0094 | 1147.77 |
| Solid infill 3 | 156147.89 | 11.056 | 1776.40320 | 0.16877 | 0.0v0945 | 1156.52 |
| Vibration-filled triangular infill 1 | 137466.96 | 6.19 | 1334.22 | 0.0945 | 0.0103 | 1105.03 |
| Vibration-filled triangular infill 2 | 133684.55 | 7.73 | 1422.50 | 0.1179 | 0.0107 | 1099.97 |
| Vibration-filled triangular infill 3 | 1335056.45 | 6.65 | 1388.80 | 0.1014 | 0.0104 | 1124.88 |
| Triangular Infill Only 1 | 87538.83 | 5.71 | 752.18 | 0.0866 | 0.0094 | |
| Triangular Infill Only 2 | 93535.57 | 5.76 | 754.32 | 0.0872 | 0.0085 | |
| Triangular Infill Only 3 | 87176.09 | 5.98 | 768.26 | 0.0906 | 0.0095 | |

Figure 29:
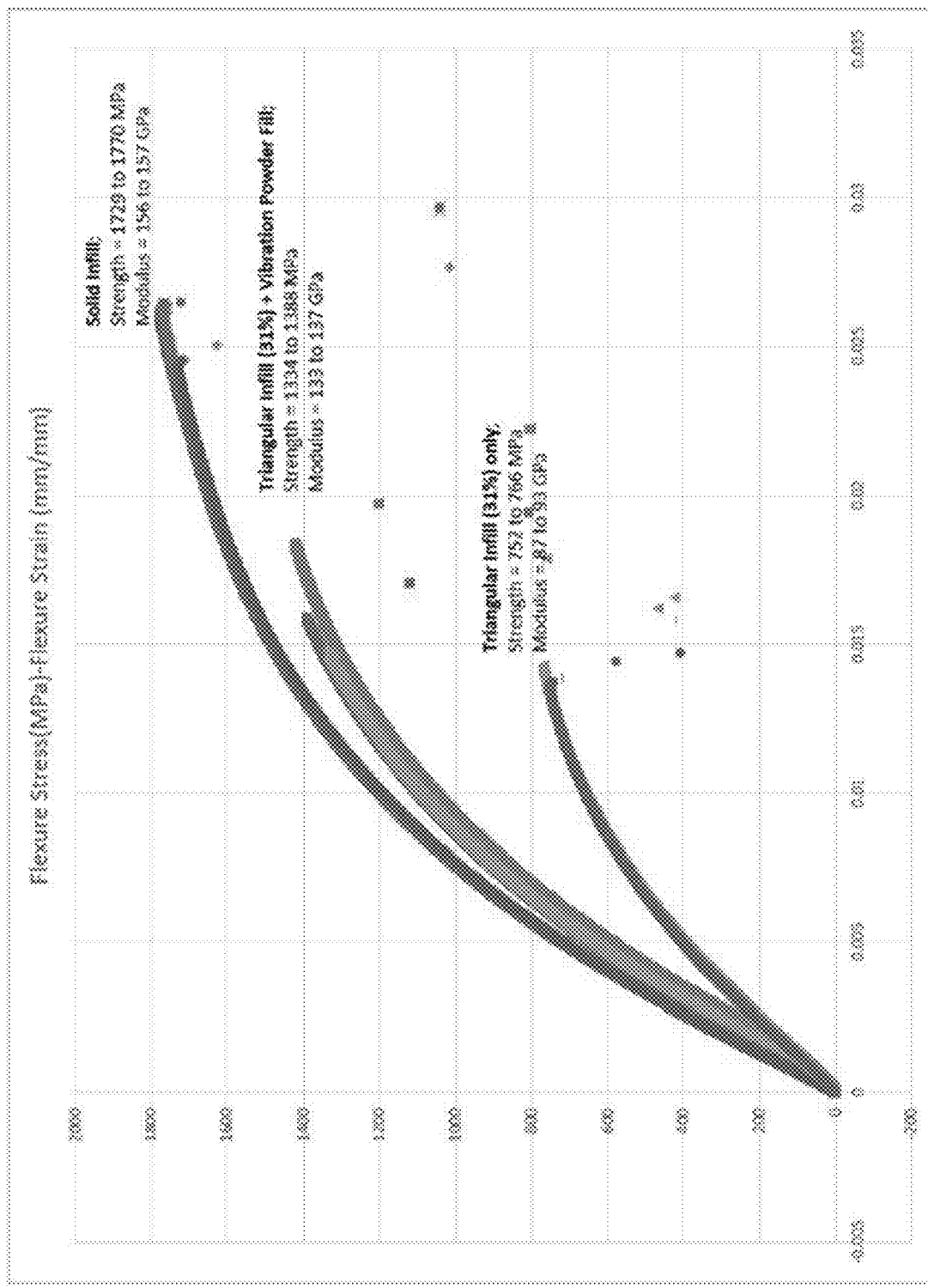
FIG. 29 graphs the stress-strain curves for solid, vibration-filled triangular infill, and triangular infill-only samples.
Figure 30:
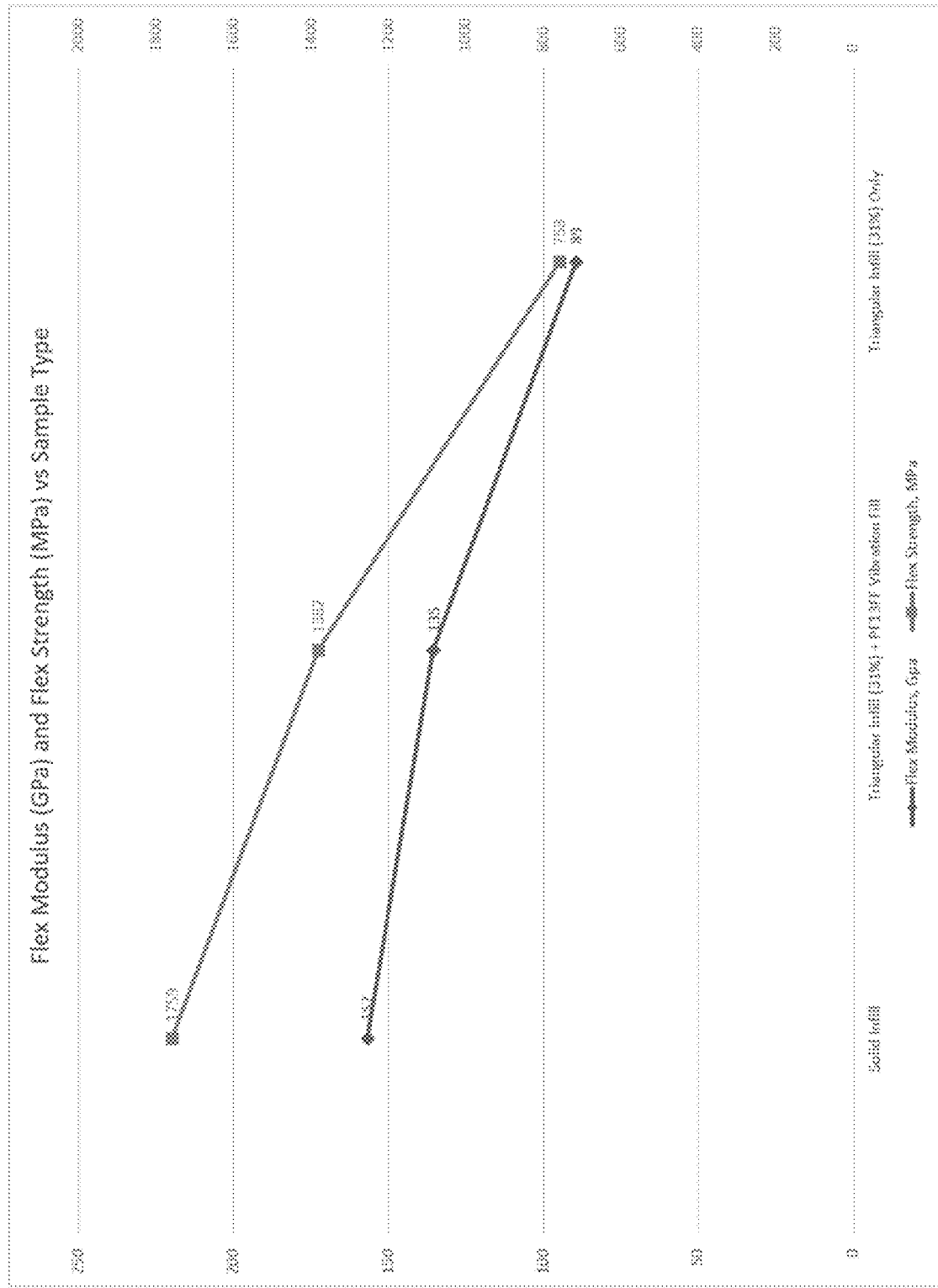
FIG. 30 graphs flex modulus (GPa) v. flex strength (MPa) for each sample type, solid, vibration-filled triangular infill, and triangular infill only.

The stress-strain curves are shown in FIG. 29 in a graph for all three samples types. FIG. 30 shows a point/line graph where each point is an average of the three samples is presented.

The data show that solid infill samples exhibited the highest flexural strength, 1759 MPa and highest flexural modulus, 157 GPa.

The triangular infill vibration-filled samples showed a 21% lower flex strength and 14% lower modulus compared to solid infill samples.

The triangular infill only samples showed the lowest properties having a 45% lower strength and 34% lower modulus than the triangular infill vibration-filled samples.

It was observed that the flex strength difference between solid infill and vibration-filled samples (21%) was about the same as the tensile strength difference between solid infill and vibration-filled samples. As a comparison, typical MF tested UTS resulted in values of 1120 MPa vs 872 MPa for triangular infill (31%) vibration-filled with PF13-FF, a 22% difference (higher value used as a basis for comparison).

It was concluded that a switch from a tensile loading scheme to a flex testing scheme failed to reveal any qualitative shift in strength properties of vibration-filled material compared to solid infill material, at least for the samples with 1:10 ratio of the printed floor to overall thickness of a sample. If the floor-to-overall thickness ratio increases, a solid infill printed floor layer will may begin to contribute to the overall sample strength, with an extreme case being 1:1 floor-to-overall thickness ratio where the sample turns into a completely solid infill printed one.

It was further observed from the data that strength and modulus values across samples types were strongly correlated. When comparing properties of solid infill and vibration-filled samples this observation pointed to microstructure defects, i.e., porosity, as a root cause of the difference in observed properties.

The strength of a sintered material can be controlled by many factors, such as porosity, grain size and phase composition. The elastic modulus of a steel is generally not influenced by any factor; in contrast, porosity has a strong detrimental influence on modulus especially at low volume fractions.

The fracture surfaces of the tested flex samples for the triangular infill sample fractured at the tensile stress face. The fracture path proceeded through the vertical infill segments, revealing intact internal infill walls behind the fracture surface.

The fracture surfaces of the tested flex samples for the solid infill sample, however, unexpectedly showed a "V-shaped" fracture surface shape and evidence of a printed pattern on one of the surfaces of the "V." A solid infill sample fracture surface should look like a fracture surface for a bulk material, but this was true for only a percentage (~60%) of the fracture surface of the sample.

Example 7

The present Example describes a method of forming a powder filled die in accordance with another embodiment of the present disclosure.

Materials and Methods

This example describes methods of manufacturing a sample part.

Figure 31:
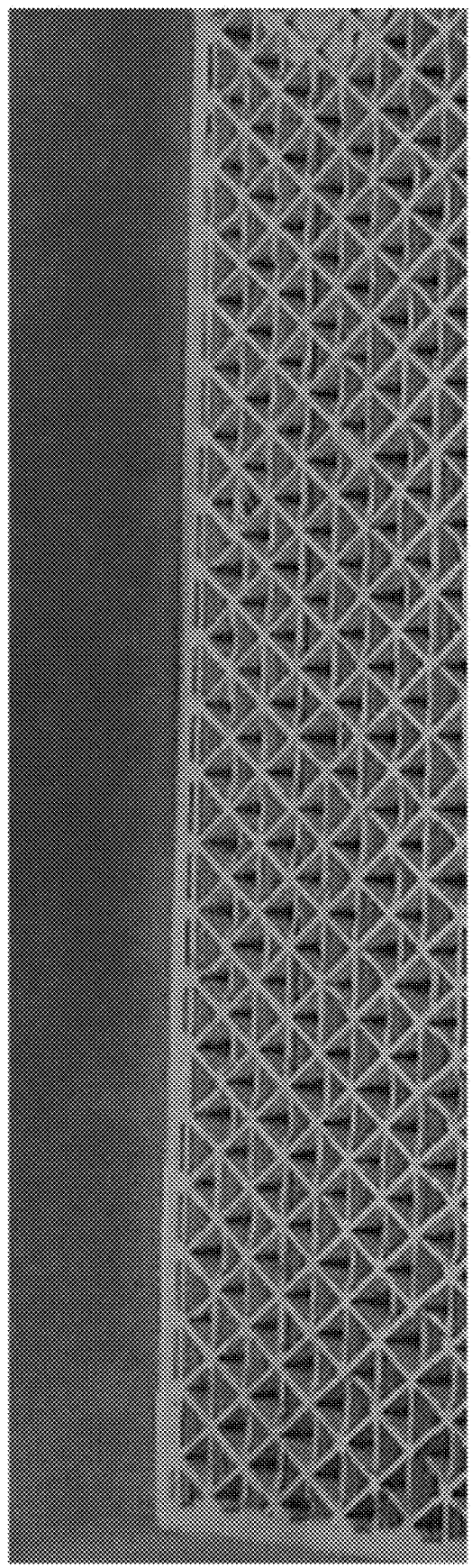
FIG. 31 shows an image of an edge of a stamping die wrapped in tape to reveal the infill and partial filling with a dry metal powder in silos of the infill.
Figure 32:
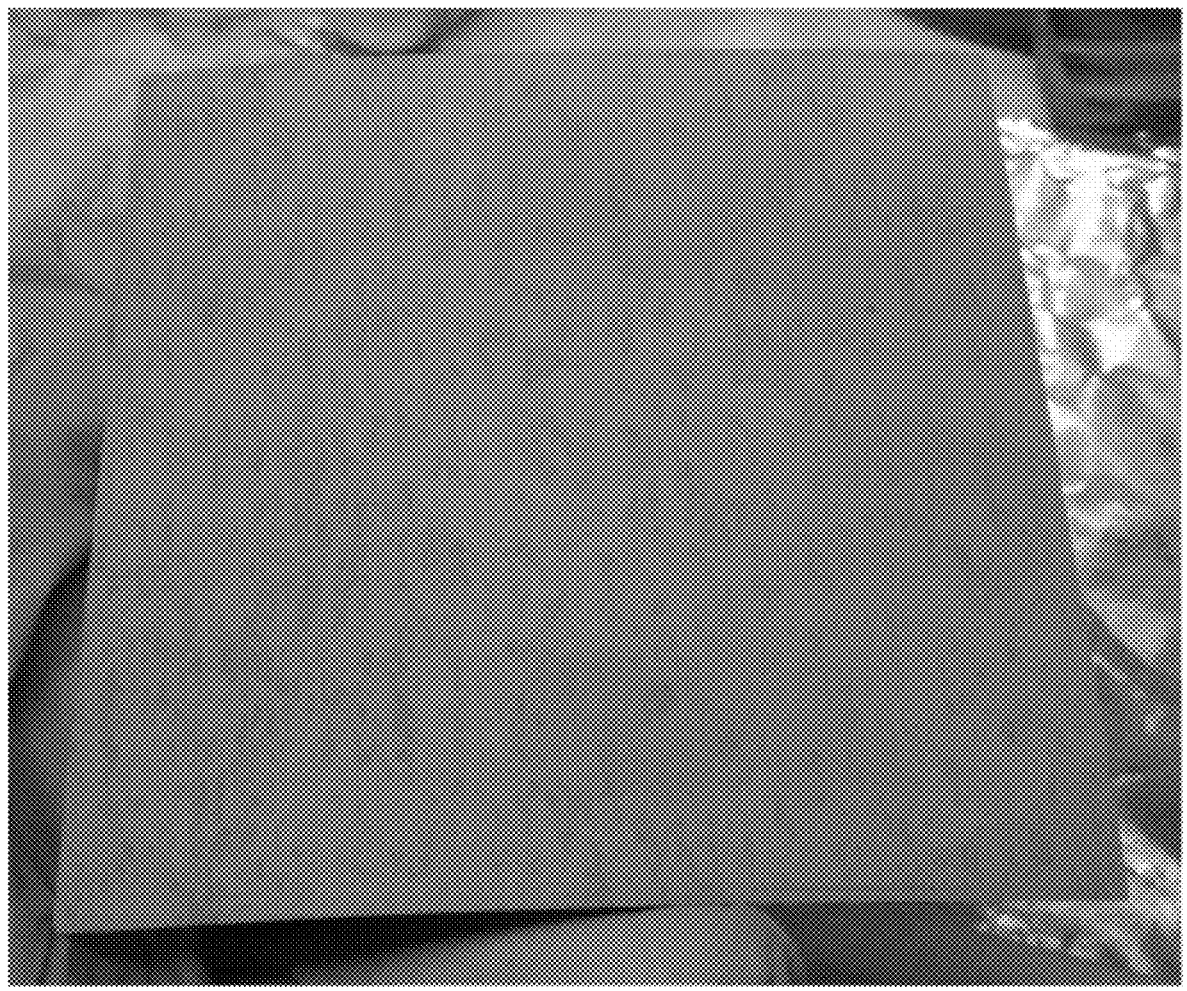
FIG. 32 shows a separately printed roof/top (floor/bottom) layer.

The die was printed using MARKFORGED® 17-4 steel filament in a working face up position. A working face up position resulted in the best working surface feature print quality. The infill of the green printed die is shown in FIG. 31. A replacement floor/roof layer was separately printed, as shown in FIG. 32.

The part and floor were washed and then the part was vibration-filled with PF13-FF dry powder. Tape was used to maintain an excess layer of about 5-10 mm deep over the part surface during vibration filling. Vibration was maintained for 3-5 minutes while constantly moving the part over vibration table to ensure even packing of the powder in the center as well as at the periphery. After the vibration was complete, the tape was removed and the excess powder layer was removed by working in the separately printed floor layer until it was sitting flush with the part surface.

Next, a ceramic support plate from a Sinter I furnace was put on top of the part and then the ceramic plate with the part were flipped over while carefully holding the part pressed against the plate. After the part was flipped over and sitting on top of the ceramic support plate, excess powder was cleaned off using a brush and a hand blower.

Figure 33:
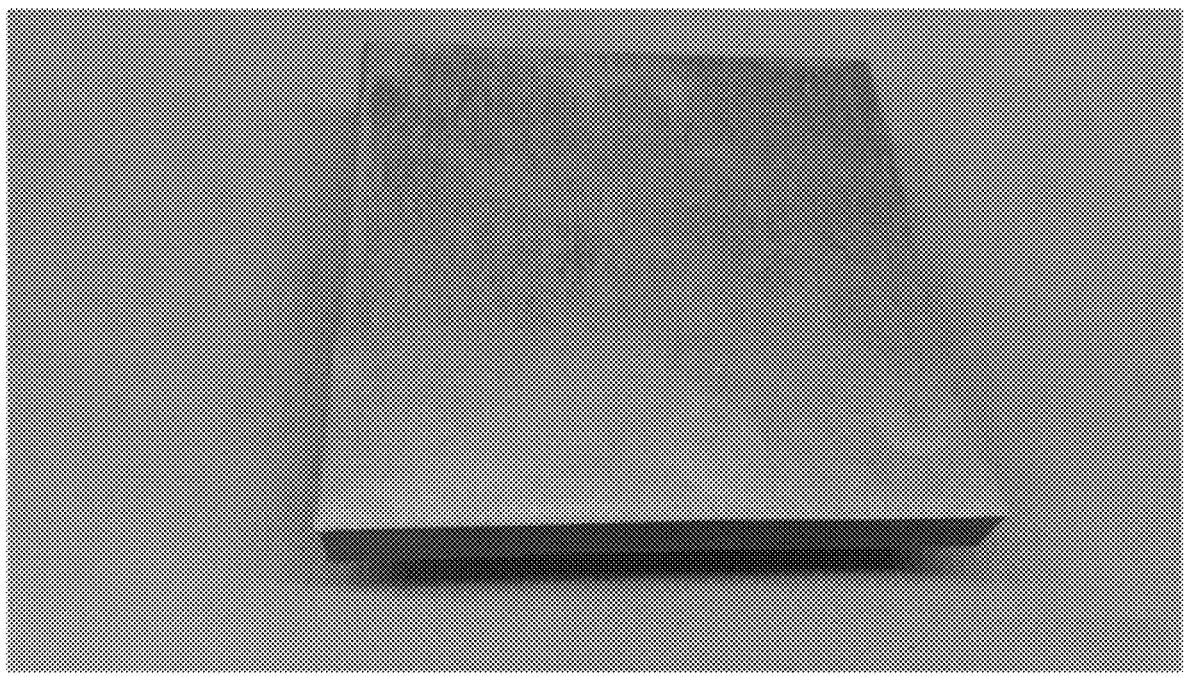
FIG. 33 shows a final stamping die from a perspective of the floor/bottom side of the die.

The part was sintered in Sinter I furnace using a modified 17-4 steel schedule having a peak temperature of 1250° C. The resulting part is shown in FIG. 33 from a bottom side.

The 76.2 mm×76.2 mm×19 mm part came out of the furnace without any visible shape distortions or cracks. Some machining and working of the surface may bring geometric dimensions of a die to its exact specification.

Archimedes density measurements showed that the part density is about 92% of the theoretical maximum density.

This was lower than expected, as a filled part density should be about 95% of the theoretical maximum density.

The observed lower density may be explained by two potential root causes. First, using a large separately printed floor cover as the floor, rather than printing the floor and part together, could have resulted in defects located under the cover. In that case, facing of the back side of the die would be beneficial to enhancing the measured density. Second, it is noted that larger hex infill cells were used for printing and filling the blocks. The larger the cell size reduced the interface surface area between the infill walls and filled powder volumes defined by them. The smaller the interface area, the smaller the number of defects that are usually associated with the interface becomes. To address that root cause, larger triangular infill cell size would have to be used during printing To improve density using this strategy it has to be proven that larger triangular infill cell size does not lead to reduced vibration-filled material strength.

Example 8

The present Example describes a method of forming a powder filled die in accordance with another embodiment of the present disclosure.

Materials and Methods

This example describes measurements of flexure strength and modulus of triangular infill (31%) printed samples vibration-filled with PF5-FF and PF10-FF powder.

The triangular print infill pattern and PF13-FF vibration fill powder are identified as resulting in the strongest sintered material. However, there is another powder size—PF10-FF, which is between PF5-FF and PF13-FF It may be possible for PF10-FF powder to sinter into a higher density material in the bulk of vibration-filled infill cells, but it is known to form chain defects along printed infill walls. PF13-FF powder generally does not form defects along infill walls but has resulted in lower density and larger pores in the bulk of the filled cells.

10 mm×10 mm×200 mm (final sintered size) flex samples were printed with a 1 mm floor and 0.5 mm walls and a 31% triangular infill setting, followed by a washing operation.

The samples were vibration-filled with a PF10-FF powder. The samples were also vibration-filled with a PF5-FF powder. A separately printed ceiling was glued on after doctor-blading excess powder to balance the printed shell shape and avoid distortion during sintering.

Figure 34:
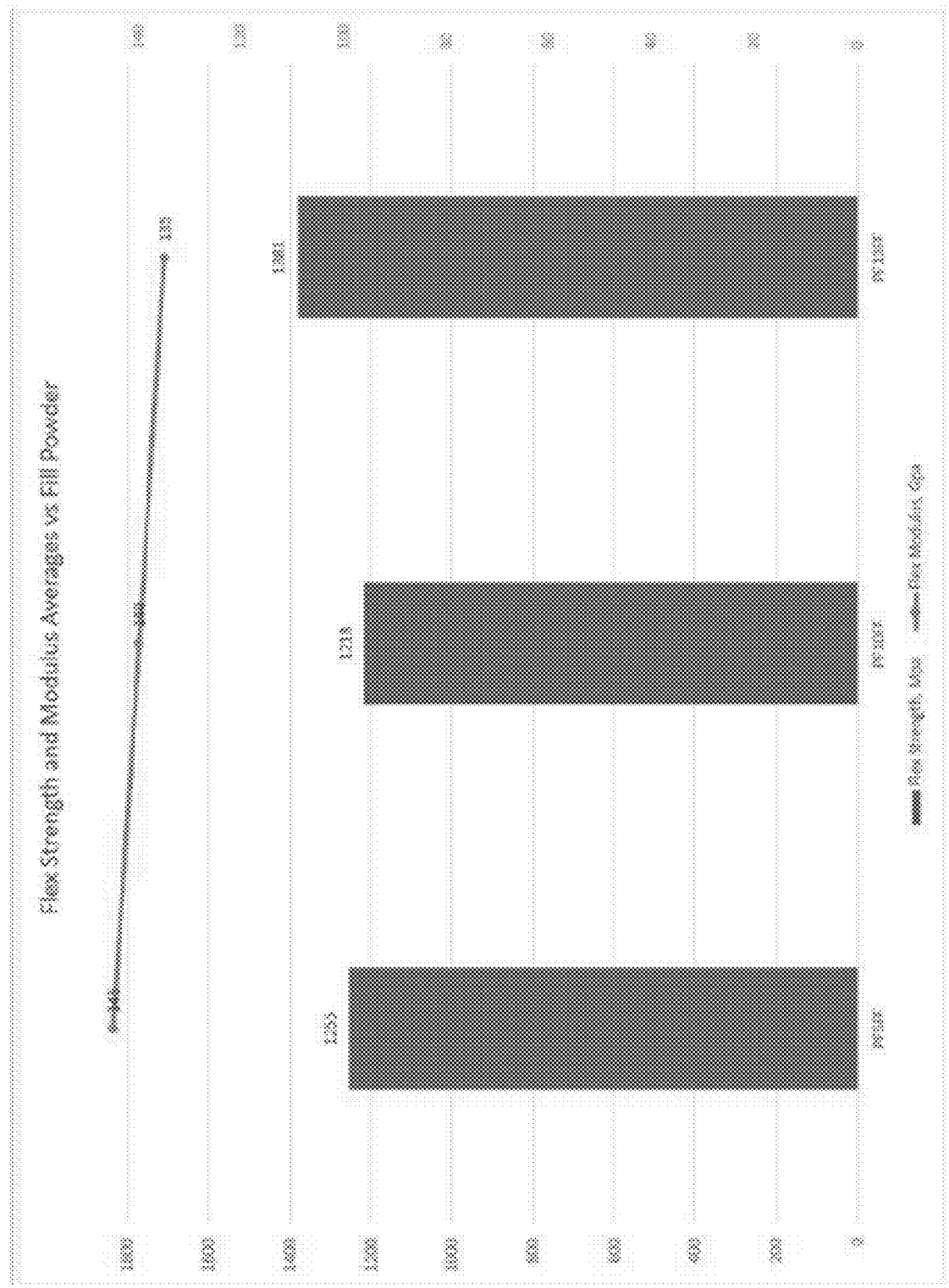
FIG. 34 graphs a comparison of average flex strength and average modulus for PF5-FF, PF10-FF, and PF13-FF.

FIG. 34 shows a graph of the results.

PF5-FF and PF10-FF filled materials showed similar strength and modulus values, e.g., a less than 5% difference. PF13-FF filled material appeared to be considerably stronger than the other two, though it is noted these samples had a reduced elasticity modulus. Strength difference in favor of PF13-FF could be explained by previous microstructure studies that showed this fill powder resulted in less defects forming at the interfaces between printed walls and filled volumes after sintering, while the lower modulus of the same material was a result of higher overall porosity resulting from larger fill powder particle size.

Example 9

The present Example describes a method of forming a powder filled die in accordance with another embodiment of the present disclosure.

Materials and Methods

This example describes forming a rectangular block having 75 mm×75 mm×20 mm (final sintered part dimensions).

The material, debinding and sintering schedules selected were for D2 tool steel.

The 75 mm×75 mm×20 mm sintered block was measured to have a post sintered density of 7.089 g/cm$^3$ and a theoretical density of 92.1% of 7.70 g/cm$^3$.

OTHER EMBODIMENTS AND EQUIVALENTS

While the present disclosure has explicitly discussed certain particular embodiments and examples of the present disclosure, those skilled in the art will appreciate that the disclosure is not intended to be limited to such embodiments or examples. On the contrary, the present disclosure encompasses various alternatives, modifications, and equivalents of such particular embodiments and/or example, as will be appreciated by those of skill in the art.

Accordingly, for example, methods and diagrams of should not be read as limited to a particular described order or arrangement of steps or elements unless explicitly stated or clearly required from context (e.g., otherwise inoperable). Furthermore, different features of particular elements that may be exemplified in different embodiments may be combined with one another in some embodiments.

What is claimed is:

1. A method of manufacturing an object, comprising steps of:
3D printing the object comprising a metal, wherein the metal forms an outer shell substantially enclosing an interior volume and an infill portion within the interior volume of the object, the infill portion having structures defining a pattern and space within the interior volume;
infiltrating the object with a metal powder such that the metal powder substantially surrounds and fills the structures defining the pattern and the space within the interior volume of the object;
separately printing a shell wall of the metal;
after infiltrating the object with the metal powder, enclosing the object with the shell wall; and
sintering the object and the shell wall such that the resultant object forms a near solid part.

2. The method of claim 1, wherein the metal powder is a dry metal powder.

3. The method of claim 1, wherein the pattern comprises diamond, gyroid, hexagonal, honeycomb, rectangle, square, or triangle.

4. The method of claim 1, wherein the metal is a filament.

5. The method of claim 1, wherein the metal comprises aluminum, copper, stainless steel, titanium, tool steel, or nickel-chromium-iron alloys.

6. The method of claim 1, wherein the metal powder comprises aluminum, copper, stainless steel, titanium, tool steel, or nickel-chromium-iron alloys.

7. The method of claim 1, wherein a percent infill is between about 30% and about 90%.

8. The method of claim 1, wherein when 3D printing the object, a surface of the outer shell of the object is unprinted to expose the space within the interior volume.

9. The method of claim 7, wherein the infill portion is filled with a dry metal powder during the step of infiltrating.

10. The method of claim 1, wherein separately printing a shell wall of the metal comprises additively depositing a separate roof.

11. The method of claim 1, wherein prior to the infiltrating step comprises a step of debinding the object to form a brown part.

12. The method of claim 1, wherein the sintering step comprises heating in a reducing argon atmosphere.

13. The method of claim 1, further comprising vibrating the metal powder within the interior volume of the infill.

* * * * *